United States Patent [19]

Inoue et al.

[11] Patent Number: 5,305,206

[45] Date of Patent: Apr. 19, 1994

[54] APPARATUS FOR PRODUCING AN OPERATION MANUAL FOR USE WITH A HOST SYSTEM

[75] Inventors: Takashi Inoue, Asaka; Kanji Kanai, Yokohama; Ikuo Yoshida, Hiratsuka; Akio Kizawa, Urayasu; Tadaaki Sakashita, Tokyo; Yoshitaka Hori, Sagamihara, all of Japan

[73] Assignee: Ricoh Company, Ltd., Tokyo, Japan

[21] Appl. No.: 644,238

[22] Filed: Jan. 22, 1991

[30] Foreign Application Priority Data

Jan. 26, 1990 [JP] Japan ................... 2-16365

[51] Int. Cl.$^5$ ............................. G06F 15/40
[52] U.S. Cl. .................. 364/419.1; 434/118; 364/419.19; 364/419.17
[58] Field of Search .............. 395/156, 157, 600, 650; 364/400, 401; 434/118

[56] References Cited

U.S. PATENT DOCUMENTS

| | | | |
|---|---|---|---|
| 4,884,199 | 11/1989 | Boothroyd et al. | 364/408 |
| 4,916,637 | 4/1990 | Allen et al. | 364/513 |
| 4,941,170 | 7/1990 | Herbst | 379/100 |
| 4,970,678 | 11/1990 | Sladowski et al. | 364/900 |
| 4,992,972 | 2/1991 | Brooks et al. | 364/900 |
| 5,038,316 | 8/1991 | Hempleman et al. | 364/900 |
| 5,155,806 | 10/1992 | Hoeber et al. | 395/157 |
| 5,175,812 | 12/1992 | Krieger | 395/156 |

FOREIGN PATENT DOCUMENTS

| | | |
|---|---|---|
| 61-243518 | 10/1986 | Japan . |
| 62-262120 | 11/1987 | Japan . |
| 63-66623 | 3/1988 | Japan . |
| 1-280821 | 11/1989 | Japan . |

*Primary Examiner*—Roy N. Envall, Jr.
*Assistant Examiner*—Andrew Bodendorf
*Attorney, Agent, or Firm*—Mason, Fenwick & Lawrence

[57] ABSTRACT

An operations manual generation apparatus for use with a host system. The apparatus has an input for receiving ordering input data when an operator places an order following a prescribed procedure for requesting an operations manual from the host system. The apparatus has a first memory which stores first information needed to prepare the requested operations manual. The apparatus also has a second memory for storing instruction information which includes a set of guidance text data which describes the minimum number of operating steps needed to be carried out by an operator. Finally, an edit controller is provided for analyzing the first information to select a suitable combination of guidance text data, so that an operations manual may be output which has been automatically optimized to minimize the number of steps which the operator must take to cause the host system to perform the desired function.

20 Claims, 19 Drawing Sheets

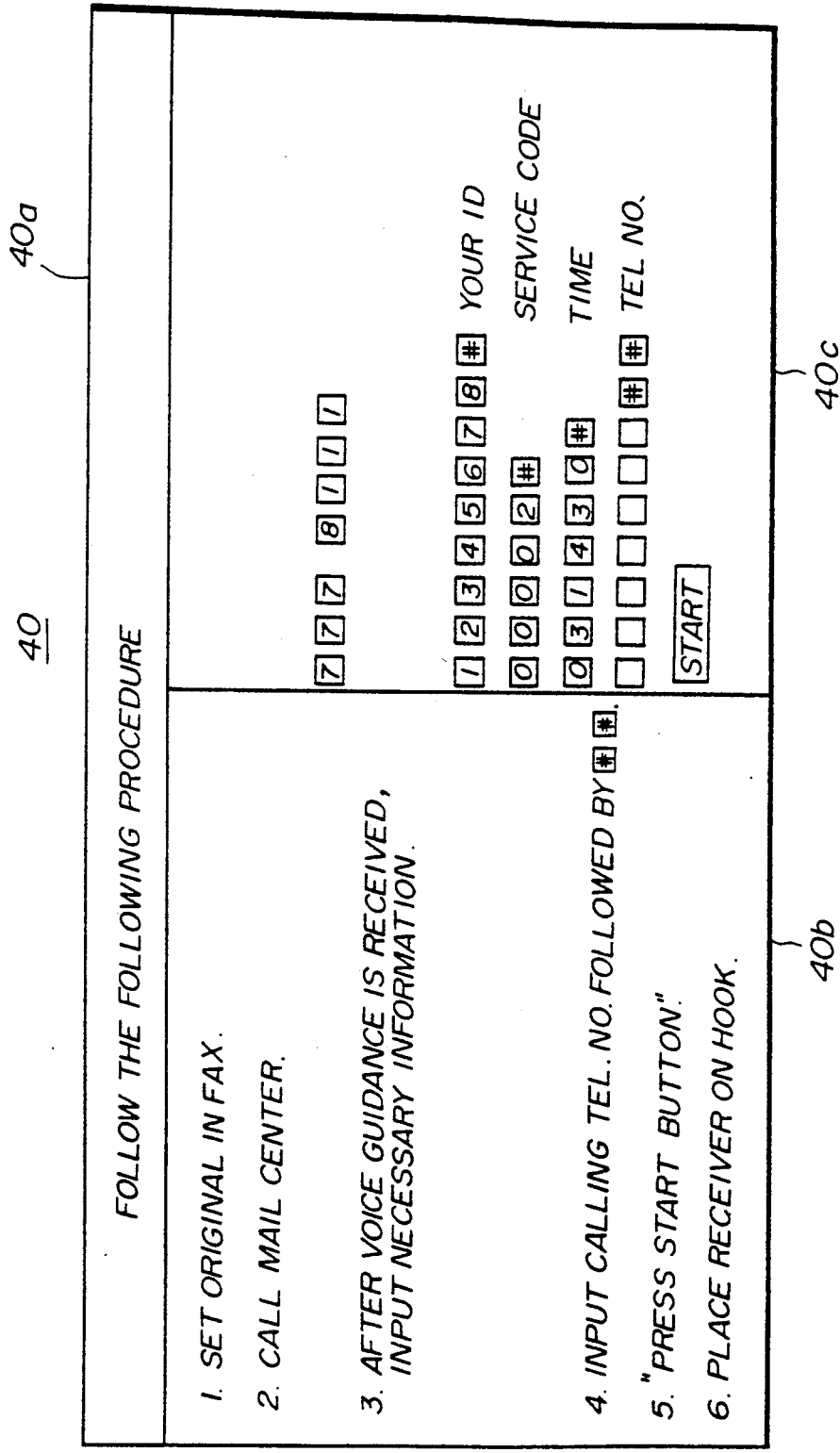

FIG. 11

FOLLOW THE FOLLOWING PROCEDURE

1. SET ORIGINAL IN FAX.
2. CALL MAIL CENTER.
3. AFTER VOICE GUIDANCE IS RECEIVED, INPUT NECESSARY INFORMATION.

```
7 7 7   8 1 1 1
```

| 1 2 3 4 5 6 7 8 # | YOUR ID |
| 0 0 0 2 # | SERVICE CODE |
| 0 3 1 4 3 0 # | TIME |
| # # | TEL NO. |

[START]

4. INPUT CALLING TEL. NO. FOLLOWED BY # #
5. "PRESS START BUTTON."
6. PLACE RECEIVER ON HOOK.

50

APPARATUS FOR PRODUCING AN OPERATION MANUAL FOR USE WITH A HOST SYSTEM

BACKGROUND OF THE INVENTION

The present invention generally relates to an operations manual editing system, and more particularly to an operations manual editing system which prepares, edits and outputs an operations manual for guiding an operator to enable a host system to execute a desired service function, when a request for the operations manual is made by the operator.

Recent information processing equipment including wordprocessors, information processors, facsimile systems and other office automation systems have come to incorporate various kinds of intelligent service functions and enhanced communication capabilities. However, for using such communication capabilities and service functions of the recent information processing equipment, one must perform a given procedure of service ordering operations which is often complicated and troublesome. To use quickly and properly such capabilities and functions of the recent information processing equipment, it is necessary for an operator to acquire a certain level of experience and knowledge about the hardware itself and the machine operation. And, the operator must become familiar with various kinds of machine operations to use quickly and properly a service function of the recent information processing equipment. Conventionally, an operations manual which is previously prepared and edited to deal with detailed information about the equipment is usually attached to such information processing equipment, enabling an operator to make efficient use of such capabilities and service functions. Therefore, the operator must carefully read or make reference to the operations manual to obtain adequate knowledge concerning the machine operation for a desired service function. However, because various kinds of intelligent functions and capabilities are provided to users and a great volume of an operations manual is often produced, it is difficult for an operator to easily and quickly learn a pertinent machine operation and become familiar with the recent information processing equipment. And, it is difficult to make a full use of the intelligent functions and capabilities of the recent information processing equipment.

Conventionally, the information processing equipment have a "help" function which provides the operator with a guidance information concerning the usage and machine operations on a display screen. When the operator is at a loss, or does not know, how to operate on the terminal for obtaining a desired function, the related information, for example, a guidance text or description to explain the meaning of key commands or the functions assigned to special keys, will appear on the display screen by depressing a specified key like a so-called "help" key on a keyboard. The "help" function, however, merely provides a prepared guidance information which appears on the display screen when the specified key is pressed, regardless of the current operating condition of the equipment. And, only with such a prepared "help" information on the display screen, it is difficult to supply guidance information that is adequate for the every level of skill or proficiency of operators to request a desired function of the information processing equipment easily and quickly.

Japanese Laid-Open Patent Application NO.61-243518 discloses a help guide system which has been proposed for eliminating the above described problem. When a user requests help, the request is analyzed by this help guide system. Display items are selected from a list of help items stored in a storage part on the basis of analyzed information, the list of help items is displayed to an output part. When the user selects each item, the selected item is displayed under the list. Pertinent help information is retrieved by the selected item. If the pertinent help information exists, this list is extracted and displayed on the output part. If the user continues to request help, the selection range is changed by repeating the same procedure. This help information is previously prepared and stored in the storage part for each help item which is expected to be needed by users. And, if pertinent information does not exist, the selection range of the list is changed to a wider range and a help information to be displayed is determined. Japanese Laid-Open Patent Application No.62-262120 discloses a guidance information system which has been proposed for displaying only pertinent and necessary guidance information depending on the frequency of the use by an operator who uses the guidance information system. When the same operator or operators belonging to the same group operates repeatedly at a given number of machine operations, displaying the guidance information on a display screen is inhibited in the next machine operation, so that only a pertinent and necessary information is displayed. Or, when the operator instructs the guidance information system to specify the information to be displayed, only pertinent and specified information is displayed in the subsequent machine operations. However, a set of such guidance information is previously prepared and stored, and only pertinent information is selected from the set of the prepared guidance information to suit the demands from expected users.

In addition, Japanese Laid-Open Patent Application No.63-66623 discloses a help information system. In this help information system, a user information concerning the personal data and the operating history and a system information concerning the environment of system terminals and the operating records are prepared and stored in a storage part. Based on the user information and the system information an efficient output method to supply pertinent help information needed by an operator is selected by this help information system, and the pertinent help information is displayed on an output part by the efficient output method selected. However, also in this system, a set of such help information is previously prepared and stored in the output part, and only pertinent information is selected from the set of the prepared help information to suit the demands from expected users.

Japanese Laid-Open Patent Application No.1-280821 discloses a guide help system which comprises an input part, an output part, amain memory part, an auxiliary memory part and a control part. In this guide help system, when a user has an operating mistake or a trouble during application of an information processor, a guidance of a concrete operating procedure can be retrieved and displayed for execution of a desired process in the application state of that time point. For instance, the user has a question about the producing procedure of a pattern during production of the pattern. In such a case, the guidance can be displayed for the substantial end of production of the pattern at that time point since the pattern is already kept under a production state. Thus, the operating efficiency for the user is improved. The guide help information in such a case is synthesized by this guide help system from a set of prepared guide help messages corresponding to each operating state and to each operation. However, an operating procedure is predetermined and the guide help information is synthesized in accordance with each operating state and each operation in the predetermined operating procedure. The guide help messages are not freely synthesized to suit the procedure of the application program.

However, in the conventional help message functions as disclosed in Japanese Laid-Open Patent Application No.61-243518, Japanese Laid-Open Patent Application No.62-262120 and Japanese Laid-Open Patent Application No.63-66623, pertinent guidance information is selected and outputted in accordance with the level of skill of an operator, but a set of help messages for supplying the help information must be previously prepared and stored in a storage part of the help guidance system. Because pertinent information is selected and outputted from those help messages depending on the level of skill of an operator, it is difficult to meet fully various kinds of the demands from several users. And, in order to meet such various kinds of the user demands, it is necessary for the information processing equipment to have a large capacity of storage devices for storing the help information covering such various kinds of the user demands. Hence, there is a problem in that the cost of manufacturing such information processing equipment with a large capacity of memory devices will become high.

In a case of the guide help system disclosed in Japanese Laid-Open Patent Application No.1-280821, in order to retrieve and display a guidance describing a concrete operating procedure from a state in which the user has an operating trouble during the application of the information processor to a state in which the user can deal with a desired process in the application, the guidance is developed by combining a set of prepared help messages corresponding to each operating state and to each operation. However, an operating procedure is predetermined and the help information is developed in accordance with each operating state and each operation in such preset operating procedure. The guide help messages are not freely developed to suit the procedure of the application program.

SUMMARY OF THE INVENTION

It is a general object of the present invention to provide an improved operations manual editing system in which the above described disadvantages or problems are eliminated.

Another and more specific object of the present invention is to provide an operations manual editing system for use with a host system, the operations manual system comprising an input part for receiving ordering data input when an ordering is made by an operator following a prescribed procedure for requesting an operations manual from the hosy system, a first memory for storing first information needed to prepare the operations manual requested by the operator, the first information being extracted from the ordering data received from the input part, a second memory for storing instruction information which includes a first set of guidance text data describing a number of operating steps that need to be carried out by an operator in order for the host system to execute a desired function chosen from among a plurality of different functions that can be executed by the host system, an edit control part for analyzing the first information stored in the first memory to select a suitable combination of guidance text data from the instruction information stored in the second memory, to create an operations manual appropriate for guiding the operator in requesting the desired function of the host system, and an output part for supplying the created operations manual in a prescribed form and layout. According to the present invention, it is possible to provide an operations manual which is useful and adequate for meeting various kinds of the requests from an operator or a user, and it is possible to reduce effectively the required capacity of a memory device, provided in the operations manual editing system, for storing the guidance text data to help the operator follow the necessary operations. And, even a beginner can operate and request a host system for executing a desired service function of the host system, without reading an operations manual originally attached to the host system. When several system information required for the host communication system to execute a desired service function are inputted initially from the communication terminal, the operations manual editing system of the present invention can prepare and edit an operations manual that contains such system information, in addition to the guidance text information for enabling the operator to request for obtaining the desired function of the host communication system.

Still another object of the present invention is to provide an operations manual editing system for use with a host communication system, the operations manual editing system comprising a plurality of communication terminals being connected to the host communication system, a receiving part for receiving ordering data input from a fisrt communication terminal among said plurality of communication terminals when an ordering is made by an operator following a prescribed procedure for requesting an operations manual tailored to the host communication system, a first memory for storing first information needed to prepare the operations manual, the first information being extracted from the ordering data from the ordering data from the receiving part, a second memory for storing instruction information including a set of guidance text data describing a plurality of operating steps that need to be carried out for execution of a desired function from among a plurality of different functions that can be executed by the host communication system, an edit control part for analyzing the first information stored in the first memory to select a suitable combination of guidance text data from the instruction information stored in the second memory to prepare an operations manual that contains said suitably combined guidance taxt data appropriate for enabling the operator to request the desired function of the host communication system, and an output part for transmitting the prepared operations manual to a second communication terminal from among said plurality of communication terminals, in accordance with the ordering data input from the first communication terminal. According to the present invention, it is possible to provide an operator at a communication terminal with an operations manual that is helpful and adequate for meeting various kinds of the requests from the operators, and it is possible to reduce effectively the required capacity of a memory device provided in the operations manual editing system for storing the guidance text data in the storage device. And, by following instructions indicated in the operations manual supplied from the operations manual editing system, every operator, even a beginner, can easily make a request for obtaining a desired function of the host communication system without reading through carefully the prepared operations manual which is original attached to the host communication system, thereby ensuring better man-machine interface and enabling the operator at the communication terminal to make use of the desired function of the host communication system easily and quickly. When several pieces of system information required for the host communication system to execute a desired service function are inputted initially from the communication terminal, the operations manual editing system according to the present invention can prepare and edit an operations manual that contains such system information in addition to the guidance text information for guiding the operator to request for obtaining the desired function of the host communication system.

Other objects, features and advantages of the present invention will be more apparent from the following detailed description when read in conjunction with the accompanying drawings.

BRIEF DESCRIPTION OF THE DRAWINGS

FIG. 10 is a view showing an example of the operations manual data stored in the operations manual making buffer;

FIG. 11 is a view showing an example of the operations manual which is outputted;

DESCRIPTION OF THE PREFERRED EMBODIMENTS

Figure 1:
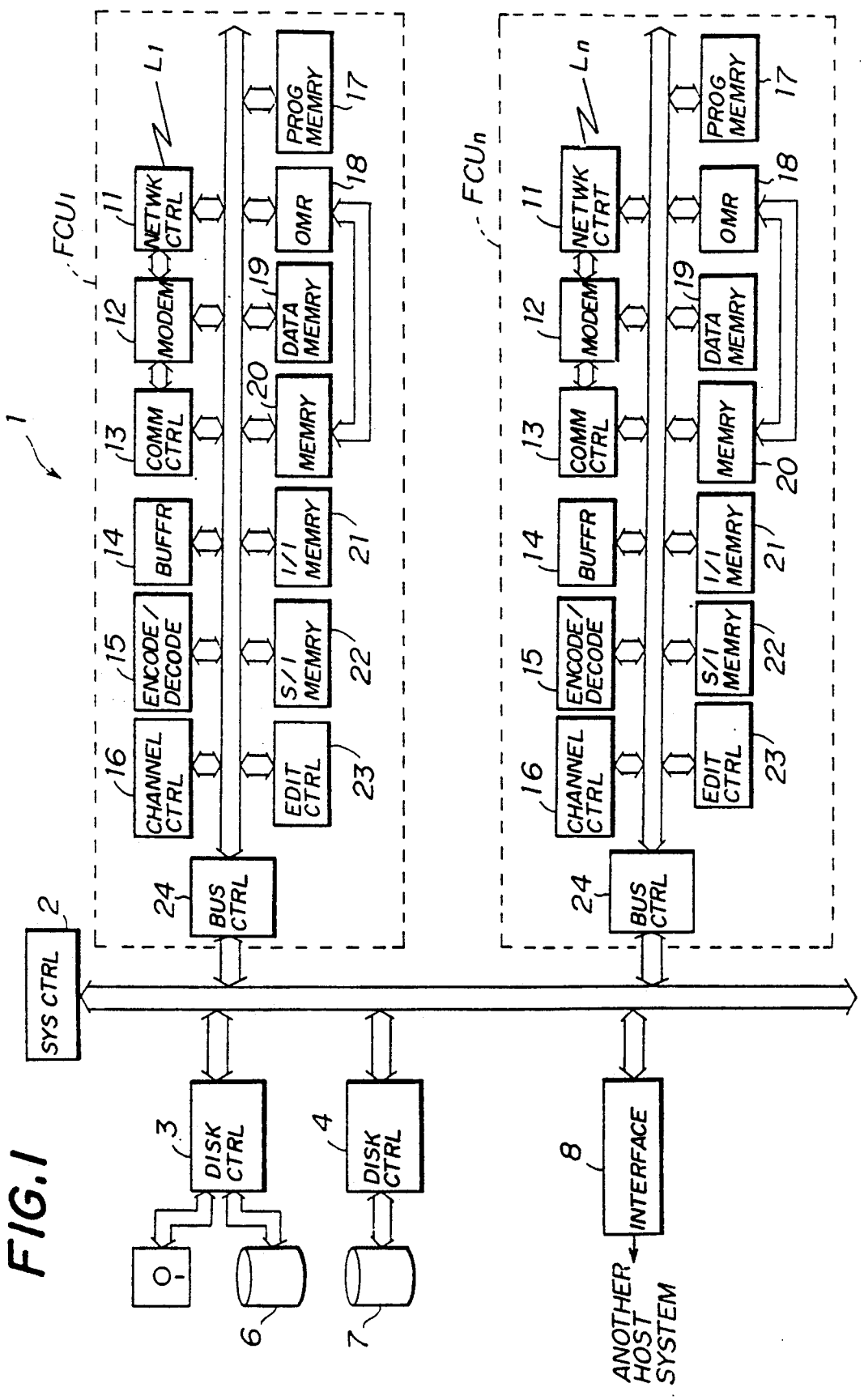
FIG. 1 is a system block chart showing the construction of a facsimile mail system (FMS) to which an operations manual editing system according to the present invention may be applied.

First, a description will be given of a preferred embodiment of an operations manual editing system according to the present invention, with reference to FIG. 1. FIG. 1 shows the construction of a facsimile mail system 1 to which an operations manual editing system of the present invention may be applied. This operations manual editing system 1 generally has a system control part 2, a disk controller 3 for controlling operation of a floppy disk drive 5 and a hard disk drive 6, a disk controller 4 for controlling operation of a hard disk drive 7, a host interface part 8, and a number of communication processing units FCU1 through FCUn. The system control part 2 controls operation of major components of the facsimile mail system 1, in accordance with a basic system control program which is stored in an internal memory, the hard disk of the hard disk drive 6 or 7, or a floppy disk in the floppy disk drive 5. The system control unit 2 also controls writing/reading of image information to/from the floppy disk or the hard disk, and further controls operation of the communication processing units FCU1 through FCUn so that a sequence of operations of the facsimile mail system 1 is performed. The facsimile mail system 1 has a number of service functions which include alternate terminal transmission, simultaneous broadcast, confidential communication transmission, time designation transmission, mail board service function, mail box service function, multiple message transmission and other facsimile functions, and the system control part 2 controls operation of the communication processing units FCU1 through FCUn for execution and control of the above described service functions. When a user makes use of a desired service function of the facsimile mail system 1, it is necessary for the user to perform a prescribed procedure of machine operation for making a request for that desired service function to the facsimile mail system 1 from a communication terminal (for instance, a facsimile machine) connected to the facsimile mail system 1. In the present invention, it is possible for an operator or user to make a request for an operations manual from the communication terminal to the facsimile mail system 1, this operations manual describing how the operator should operate on the communication terminal for obtaining such a desired service function of the facsimile mail system 1.

The disk control parts 3 and 4 control a driving of the floppy disk drive 5 and the hard disk drives 6 and 7. The basic system control program of the facsimile mail system 1 and several transmission data are stored in the floppy disk in the floppy disk drive 5 or the hard disk in the hard disk drive 6 or 7. The several transmission data include especially text data received from an external terminal or from an external host system. The external host system such as a computer system is connected to the host interface part 8, and the host interface part 8 controls communications of the facsimile mail system 1 with such an external host system. This host system is not limited to a computer system, and it may be another facsimile mail system. The host interface part 8 uses a direct memory access controller (DMAC) which connects the facsimile mail system 1 directly to the external host system, or otherwise uses a communication controller which connects the facsimile mail system 1 to the external host system via a communications line.

The number of communication processing units FCU1 through FCUn provided in the facsimile mail system 1 corresponds to the number of communications lines L1 through Ln actually connected to the facsimile mail system 1. As indicated by a dotted line in FIG. 1, each of the communication processing units FCU1 through FCUn comprises a network controller (NETWK CTRL) 11, a modem (MODEM) 12, a communication controller (COMM CTRL) 13, an operations manual making buffer (BUFFR) 14, an encoding/decoding part (ENCODE/DECODE) 15, a channel controller (CHANNEL CTRL) 16, a control program memory (PROG MEMRY) 17, an optical mark reader (OMR) 18, a data memory (DATA MEMRY) 19, a memory (MEMRY) 20, an instruction information memory (I/I MEMRY) 21, a system information memory (S/I MEMRY) 22, an edit controller (EDIT CTRL) 23, and a bus controller (BUS CTRL) 24.

In each communication processing unit FCU, the network controller 11 is connected to one of the communications lines L1 through Ln which may be, for example, a telephone line. This network controller 11 employs a so-called AA-NCU unit which executes automatic calling/receiving steps. The modem 12 executes modulation of a signal to be transmitted and demodulation of a received signal. The communication controller 13 transmits/receives a facsimile control signal to/from a communication terminal (for example, a facsimile machine) via a communications line, for execution of a facsimile communication. The operations manual making buffer 14 is used for storing a preparatory information for making an operations manual, which will be described below in greater detail.

The encoding/decoding part 15 converts a transmitted text data into coded information based on a predetermined coding method, as well as decodes the coded information into the original text data. The control program memory 17 stores a basic communication control program for controlling the operation of the communication control units FCU1 through FCUn individually, an operations manual making control program for controlling the making and outputting of an operations manual according to the present invention, and other several control programs. The channel controller 16 controls the components of each communication control unit FCU in accordance with the basic communication control program for executing several operations of the communication control unit FCU, and controls also the execution of the making and outputting of an operations manual in accordance with the operations manual making making control program stored in the control program memory 17.

The optical mark reader (OMR) 18 receives a transmitted text information from an external terminal, and checks whether such transmitted information is a text included in an OMR data sheet or not. If the transmitted information is a text of an OMR data sheet, the optical mark reader 18 detects marks and mark positions in the OMR data sheet from such transmitted information of the OMR data sheet, and stores information corresponding to the detection results in the memory 20, which will be described below. The data memory (DATA MEMRY) 19 stores only information necessary for making an operations manual among the transmitted text or dial tone signal sent from an external terminal via a communications line among the communications lines L1 through Ln. This information necessary for making an operations manual includes, for instance, an operations manual request command, the type of an operations manual requested (or, the type of a service function of the facsimile mail system 1 which is selected by an operator at the external terminal), an identification code to identify the operator who orders the operations manual (e.g., terminal identification code, user identification code), and a code concerning the degree of operation skill of the operator. These kinds of information is stored in the data memory 19.

The memory (MEMRY) 20 temporarily stores text information including detection results of the OMR data sheet detected by the OMR 18 as well as information other than the text information from the OMR data sheet, before transferring such text information to the floppy disk or the hard disk 7. Also, when the text information stored in a floppy disk or in the hard disk is transmitted to an external terminal via the facsimile control unit among FCU1 through FCUn, the memory 20 temporarily stores such text information before transmission.

Figure 2:
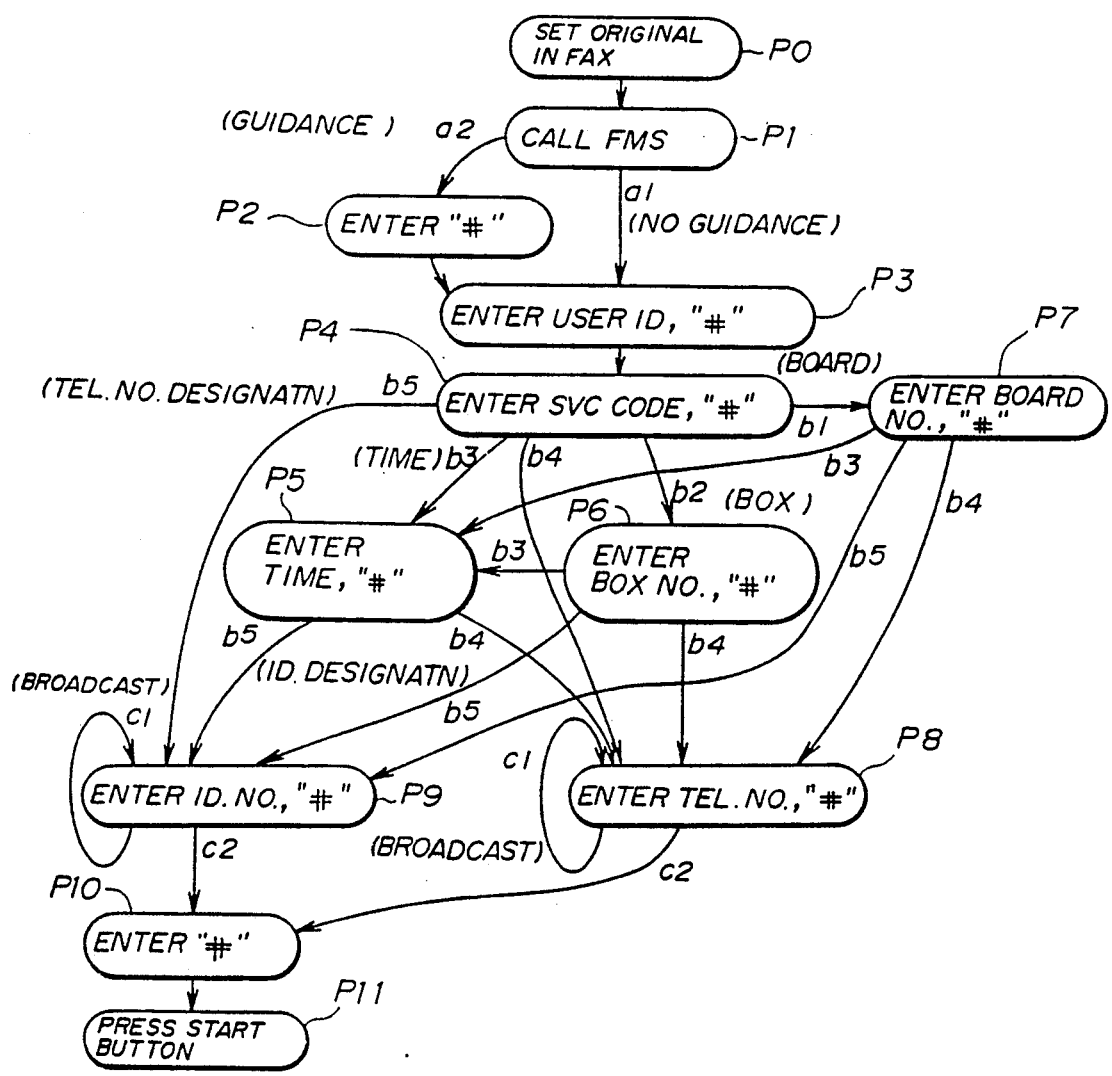
FIG. 2 is a diagram for explaining the procedure of the facsimile mail system shown in FIG. 1.

The instruction information memory (I/I MEMRY) 21 stores instruction information describing each of operating steps required for an operator at a communication terminal to enable a host system (e.g., the facsimile mail system 1) to execute a desired service function requested by the operator. As shown in FIG. 2, when an operator at a communication terminal makes a request for a desired service function to the host system, it is necessary for the operator to perform a prescribed procedure of ordering steps P0 through P11 on the communication terminal for allowing the host system to execute the desired service function of the host system. The instruction information which describes how to operate on the communication terminal for each of the ordering steps P0 through P11 required for the operator is prerecorded in the instruction information memory 21. According to the present invention, it is possible that the instruction information memory 21 stores only the instruction information describing a prescribed procedure for each of the ordering steps to be performed by the operator at the communication terminal, which are necessary for enabling the host system to execute a desired service function of the host system. According to the present invention, it is unnecessary to store several kinds of "help" messages which suit several levels of operation skill of individual operators for each of service functions of the host system, as being used by the conventional system.

The system information memory (S/I MEMRY) 22 stores a system information which is used by the host system such as the facsimile mail system 1 for carrying out a service function of the host system. This system information stored in the system information memory 22 includes, for instance, a list of user identification numbers (USER ID NO.), a list of destination identification numbers and a list of destination telephone numbers (TEL NO.). The edit control part (EDIT CTRL) 23, when an operations manual is requested from an external terminal, analyzes the information stored in the data memory 19 to determine the degree of operation skill of the operator at the external terminal and the type of the operations manual requested. And, the edit control part 23 reads out the instruction information, which describes how an operator should operate on the external terminal for enabling the host system to carry out a desired service function for each of a number of operating steps, from the instruction information memory 21, and prepares and edits an operations manual using working areas in the operations manual making buffer 14. When there is a system information that is stored in the system information memory 22 and the system information is required for the host system to perform the service function concerned, the edit control part 23 incorporates the system information in preparation data in the operations making buffer 14, so that the operations manual with the system information included is prepared and edited.

As described above, the facsimile mail system 1 in which a number of communications lines L1 through Ln are installed and connected with the corresponding communication processing units FCU1 through FCUn, respectively, performs a bidirectional facsimile communication with a plurality of external communication terminals via the communications lines L1 through Ln. Generally, the facsimile mail system 1, when a request is made from an external terminal for a desired service function of the facsimile mail system 1, analyzes a request data inputted when requested from the external terminal, and offers the requested service to the external terminal or to another external terminals. There are two methods that can be used for making a request for a service function of the facsimile mail system from an external terminal, one method using an OMR data sheet and the other using a push-button (PB) tone signal or dial tone signal.

When a request for a service function is made from an external terminal by an OMR data sheet, the OMR part 18 of the facsimile mail system 1 optically recognizes marked positions in the OMR data sheet and transfers the recognized data of the marked positions to the memory 20. The channel control part 16 analyzes the contents of the memory 20 to check what is requested by the OMR data sheet, and carries out the requested service function. For example, when a service function of time designation transmission is requested, the facsimile mail system 1 receives an encoded text information and temporarily stores the text information received within the memory 20. In some cases, the received text information may be decoded by the encoding/decoding part 15 and again encoded by a prescribed coding procedure into a suitable code information. Such text information stored in the memory 20 is transferred to a floppy disk in the floppy disk drive 5 or to the hard disk 6 or 7. After this, when a designated time is reached, the text information stored in the floppy disk in the floppy disk drive 5 or in the hard disk 6 or 7 is read and transferred to a communication processing unit among the FCU1 through FCUn, which is found it is not busy, via the bus control part 24. The FCU which receives the text information temporarily stores the received text information in the memory 20, and transmits such information to a designated terminal via the communications line. In some cases, the test information stored in the memory 20 before transmission is encoded by the encoding/decoding part 15 into a suitable coded information according to a prescribed coding procedure. The network control part 11, the modem 12, the communication control part 13 and the OMR 18 of the FCU, as shown in FIG. 1, constitute a receiving control part according to the present invention which receives an operation data from an external communication terminal. A keyboard (not shown) of the facsimile mail system 1 and a keyboard control part thereof (not shown) constitute an input part according to the present invention which receives an operation data when any operation is made from the keyboard to the facsimile mail system 1 as a host system.

Next, a description will be given of the operation of the operations manual editing system according to the present invention.

When a request for a specified service function of the facsimile mail system 1 is made from a communication terminal, the facsimile mail system 1 will offer the specified service function to meet the request from the communication terminal. However, when an operator at the communication terminal is at a loss how to operate on the communication terminal for ordering a desired service function to the facsimile mail system 1, the facsimile mail system 1 receives such a request for operations manual made by the operator at the communication terminal. The facsimile mail system 1 prepares and edits a suitable operations manual which describes each of operating steps for guiding the operator to enable the facsimile mail system 1 to offer the desired service function.

Figure 3:
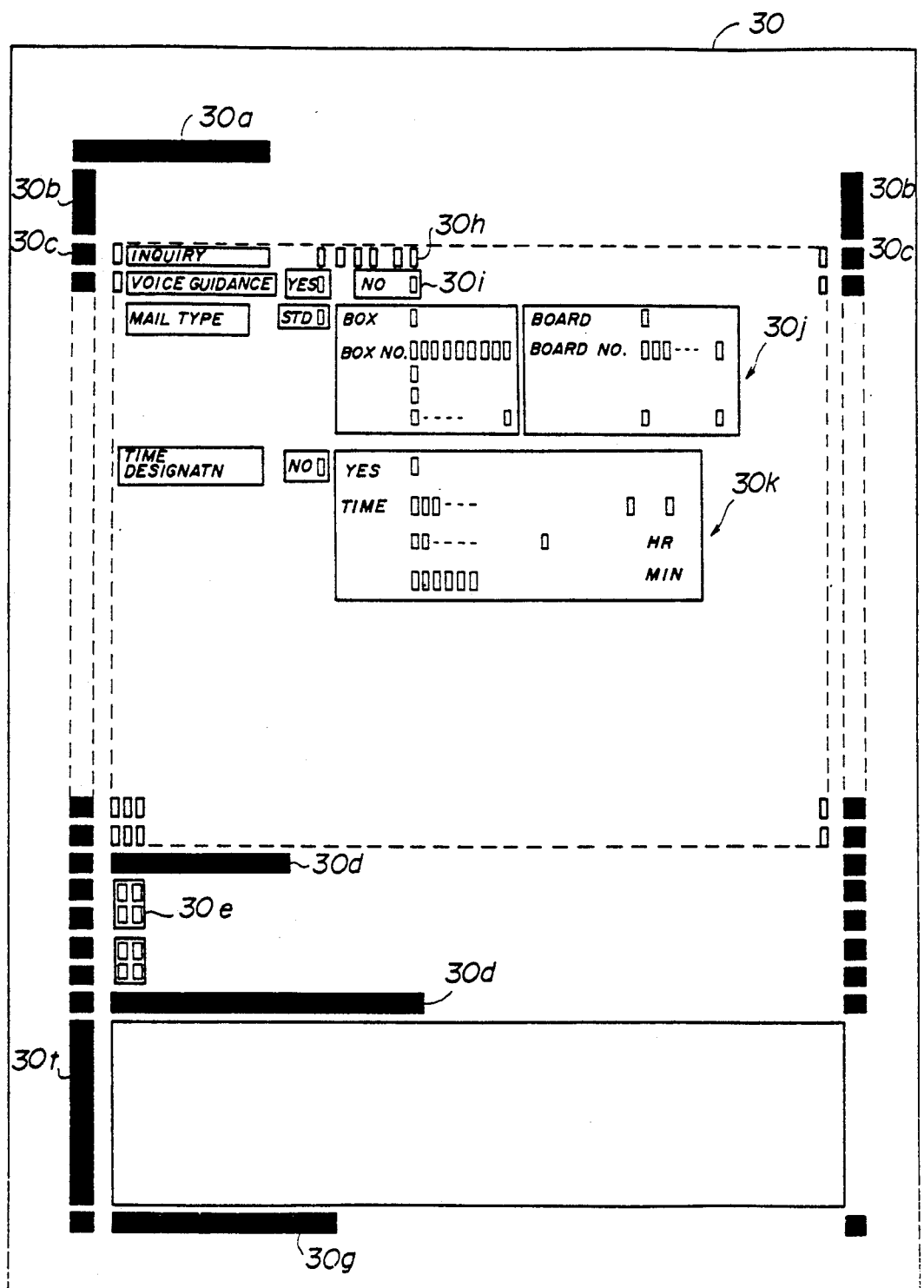
FIG. 3 is a view showing the form and layout of an OMR data sheet which is used for making a request for an operations manual.

There are two methods that can be used for an operator at a communication terminal to make a request for operations manual to the facsimile mail system 1, one is a method using a push-button (PB) tone signal and the other using an OMR data sheet. When the PB tone signal method is used, an operator at the communication terminal can make a request for operations manual by keystroke operation following a voice guidance from the facsimile mail system 1. A tone signal due to the keystroke operation is supplied to the facsimile mail system 1, and the facsimile mail system 1 receives an operations manual request by this PB tone signal. When the OMR data sheet method is used, an operator can make a request for operations manual to the facsimile mail system 1 by transmitting to the facsimile mail system 1 an OMR data sheet 30 which is prepared for the purpose of the operations manual request. This OMR data sheet 30 prepared for operations manual request is, for example, an OMR data sheet shown in FIG. 3 which generally has, similarly to an ordinary OMR data sheet, a start-of-sheet mark 30a, an allowable initial inclination limit check mark 30b, a guide mark 30c, a mode change mark 30d, a special numeric letter mark 30e, a free region indication mark 30f, an end-of-sheet mark 30g and the others. This OMR data sheet 30 further comprises special markings provided for operations manual request which are, as shown in FIG. 3, an inquiry indication mark 30h, a voice guidance request mark 30i, a mail type mark 30j (indicative of the service function desired), a time designation mark 30k, and so on. Marks on these marking positions in an OMR data sheet 30 are optically recognized by the OMR part 18 of the FCU. An operator at a communication terminal (for example, a facsimile machine) who makes a request for operations manual with an OMR data sheet 30 first calls the facsimile mail system (FMS) 1, and next transmits the OMR data sheet 30 from the communication terminal to the facsimile mail system 1.

Next, a description will be given of the procedure which is carried out by the facsimile mail system 1, with reference to FIGS. 4 through 7.

Figure 4A:
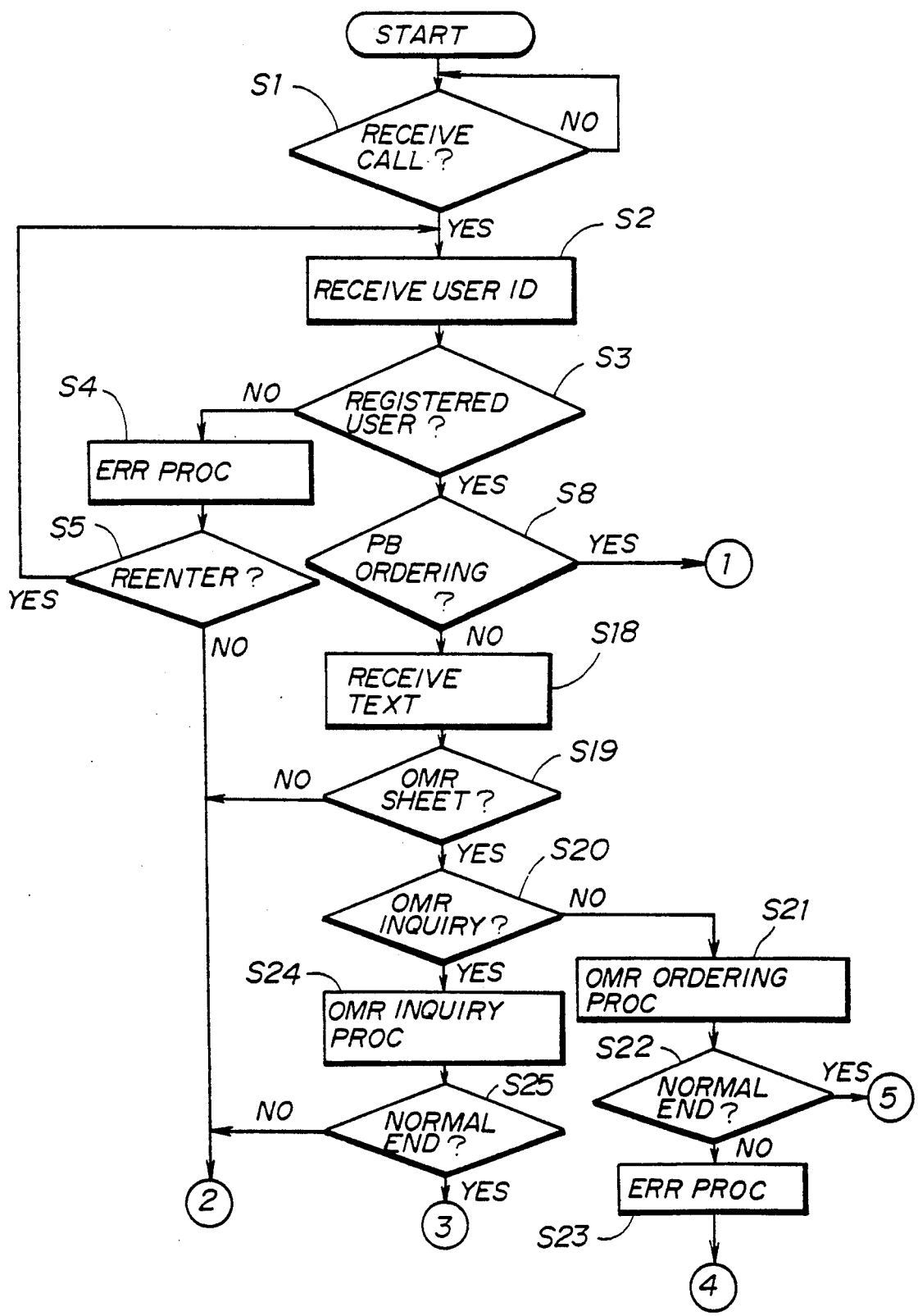
FIGS. 4A through 4C are a flow chart for explaining the basic procedure of the facsimile mail system according to the present invention.
Figure 4B:
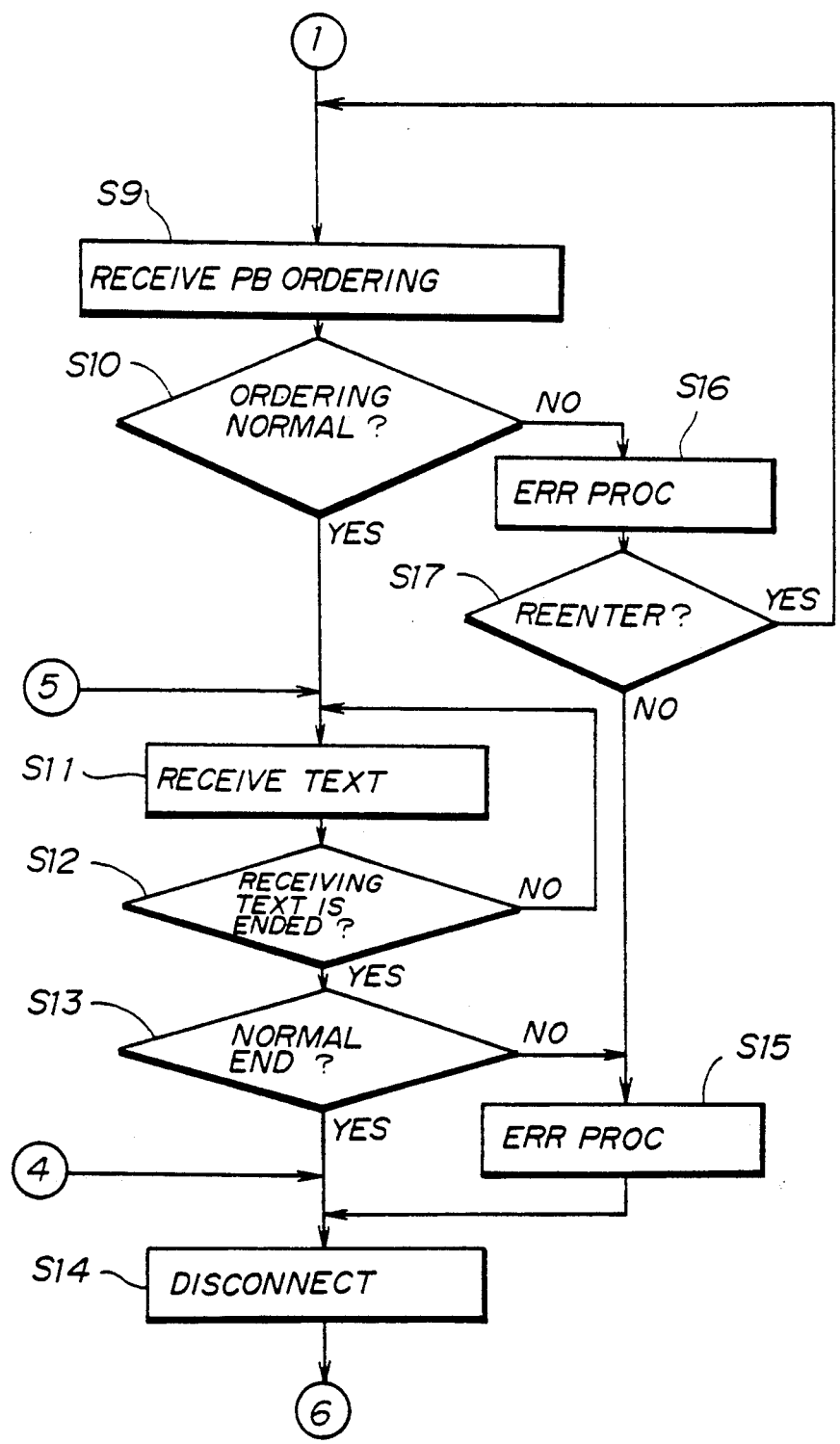
Figure 4C:
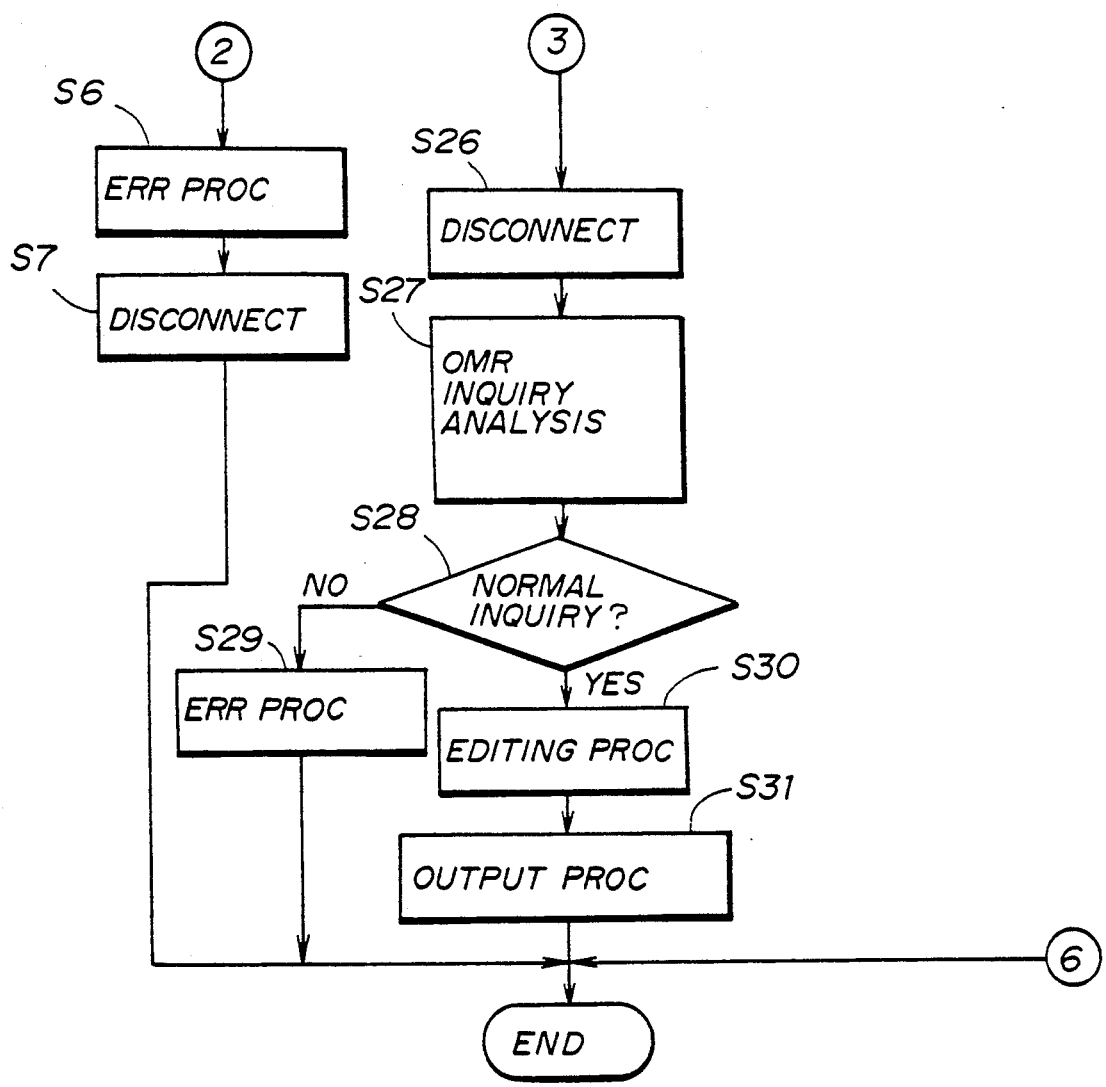

As shown in FIG. 4A, a step S1 checks whether a call from the communication terminal is received by the facsimile mail system1. If the call is received, then a step S2 receives a user identification code (USER ID) and a step S3 makes a decision on whether the user identification code is registered in the system information memory (S/I MEMRY) 22. Because the facsimile mail system 1 usually can be used by registered users only, when it is found that the USER ID code is not found in the memory 22, a step S4 next performs an error procedure and a step S5 checks whether a reentry of user identification code will be made. If the reentry is made, then the step S2 is taken to receive a new USER ID code again. If the reentry is not made, then a step S6 performs an error procedure and a step S7 disconnects the communications line from the facsimile mail system 1 and this procedure of the facsimile mail system 1 is ended, as shown in FIG. 4C.

In the step S3 above, if the USER ID code received is registered in the system information memory 22, then a step S8 checks whether the ordering is made by a push button (PB) tone signal. An ordering which is made by a PB tone signal is hereinafter called a PB ordering. If the ordering made is this PB ordering, then a step S9 receives the PB ordering, as shown in FIG. 4B. After receiving the PB ordering is completed, a step S10 checks whether the PB ordering received is normal. If the PB ordering is received normally, then a step S11 starts to receive text information included in the PB ordering. A step S12 checks whether the receiving of the text information in the PB ordering is ended. After the receiving of the text information is ended, a step S13 checks whether the text information in the PB ordering is received normally. If all the text information in the PB ordering is normally received, then a step S14 disconnects the communications line (L1−Ln) from the facsimile mail system 1. If the text information therein is found to be received abnormally in the step S13, then a step S15 performs an error procedure and the step S14 is next taken to disconnect the communications line and this procedure of the facsimile mail system 1 is ended.

In the step S10 above, when the PB ordering is found abnormal, a step S16 is next taken to performs an error procedure. In this error procedure, for example, the operator at the communication terminal is notified of such abnormal PB ordering being made by the operator. Then, a step S17 checks whether the operator make an reentry of the ordering. If the ordering is reentered from the communication terminal, then the step S9 is again taken to receive a new PB ordering in a similar manner. If the ordering is not entered again, then the step S15 is taken to perform the error procedure (for example, the operator at the communication terminal is notified that the communications line will be disconnected from the facsimile mail system) and the step S14 disconnects the communications line. These steps S9 through S17 are a normal receiving procedure of the facsimile mail system 1 for receiving a service request from an operator at a communication terminal.

In the step S8 above, when the ordering for a service function is not made by a PB tone signal, then a step S18 receives the text information included in the ordering. Based on the text information received, a step S19 checks whether the ordering is made by an ordinary OMR data sheet or not, and a step S20 checks whether the ordering is an inquiry made by an OMR data sheet prepared for operations manual request. This inquiry is hereinafter called an OMR inquiry. If the ordering made is not an OMR inquiry, then a step S21 performs an ordinary OMR ordering procedure. In this OMR ordering procedure, for example, marked positions indicated in the OMR data sheet are recognized with the optical mark reader (OMR) part 18 from the information included in the OMR data sheet, and the information indicating the marked positions is transferred to and stored in the memory 20. The channel control part 16 analyzes the information from the OMR data sheet stored in the memory 20 to check what service function is requested by the ordering. A step S22 checks whether the OMR ordering procedure described above is performed normally. If the OMR ordering is made abnormally, then a step S23 carries out an error procedure and the step S14 is next taken, as shown in FIG. 4B, to disconnect the communications line (L1−Ln) from the facsimile mail system 1. If the OMR ordering procedure is ended normally, then the steps S11 through S15, shown in FIG. 4B, are carried out to receive the text information included in the OMR ordering, and disconnect the communications line only when all the text information is received normally.

When the OMR inquiry is made in the step S20 above, a step S24 performs an OMR inquiry procedure requested by the OMR data sheet for operations manual request. A step S25 checks whether the OMR inquiry procedure is ended normally. If the OMR inquiry procedure is ended abnormally, then the steps S6 and S7, as shown in FIG. 4C, are taken to perform an error procedure and a disconnection of the communications line from the facsimile mail system 1, respectively. If the OMR inquiry procedure is completed normally, then a step S26 temporarily disconnects the communications line, as shown in FIG. 4C. A step S27 analyzes the OMR inquiry to detect what service function is requested by the OMR data sheet prepared for operations manual request, which will be described below in greater detail. A step S28 makes a decision on whether the contents of the OMR inquiry are normal. If the contents of the OMR inquiry is abnormal, then a step S29 performs an error procedure and this procedure of the facsimile mail system 1 is terminated. For example, in this error procedure the operator at the communication terminal is notified of such abnormal OMR inquiry being made. If the contents of the OMR inquiry are found normal in the step S28, then a step S30 performs an operations manual editing procedure and a step S31 performs an operations manual outputting procedure. For example, in the operations manual outputting procedure, the operations manual prepared and edited by the facsimile mail system 1 may be transmitted directly to the communication terminal from which the operations manual ordering is made. Otherwise, it may be stored in a mail box within the facsimile mail system 1, and later, when a request for outputting the operations manual is made from a communication terminal, the operations manual stored in the mail box may be transmitted to the communication terminal specified. And, the procedure of the facsimile mail system 1 is completed.

Next, a description will be given of the OMR inquiry analysis procedure in the step S27 above. In each communication control unit of the FCU1 through FCUn, the optical mark reader (OMR) part 18 reads the marked positions in the OMR data sheet 30 from the received text which is included in the OMR data sheet 30, and transfers the information concerning the marked positions in the memory 20. The channel control part 16 analyzes the information from the OMR data sheet 30 stored in the memory 20 to determine what service function is requested by the OMR data sheet 30.

Figure 5A:
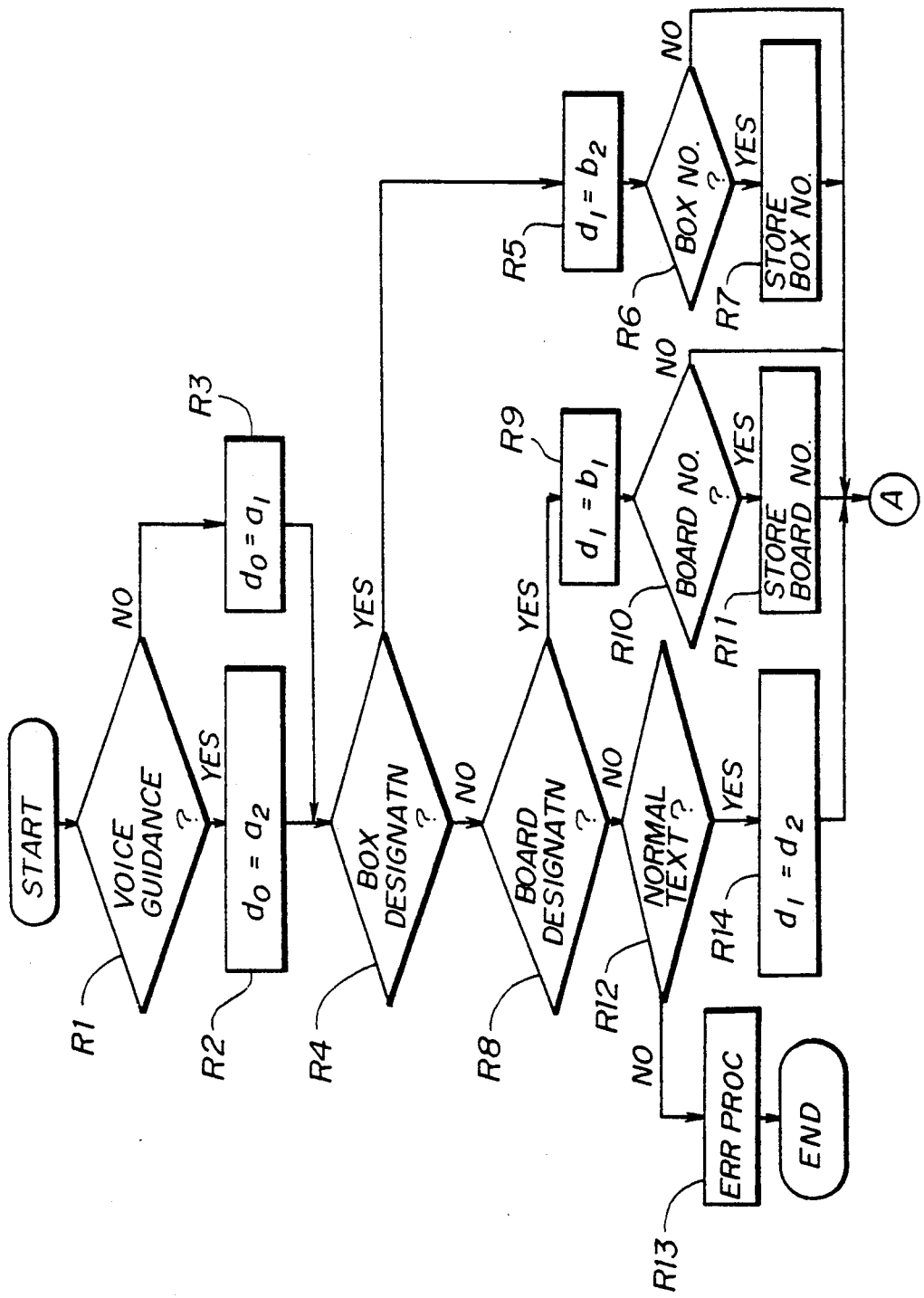
FIGS. 5A and 5B are a flow chart for explaining the procedure to analyze an operations manual request.
Figure 5B:
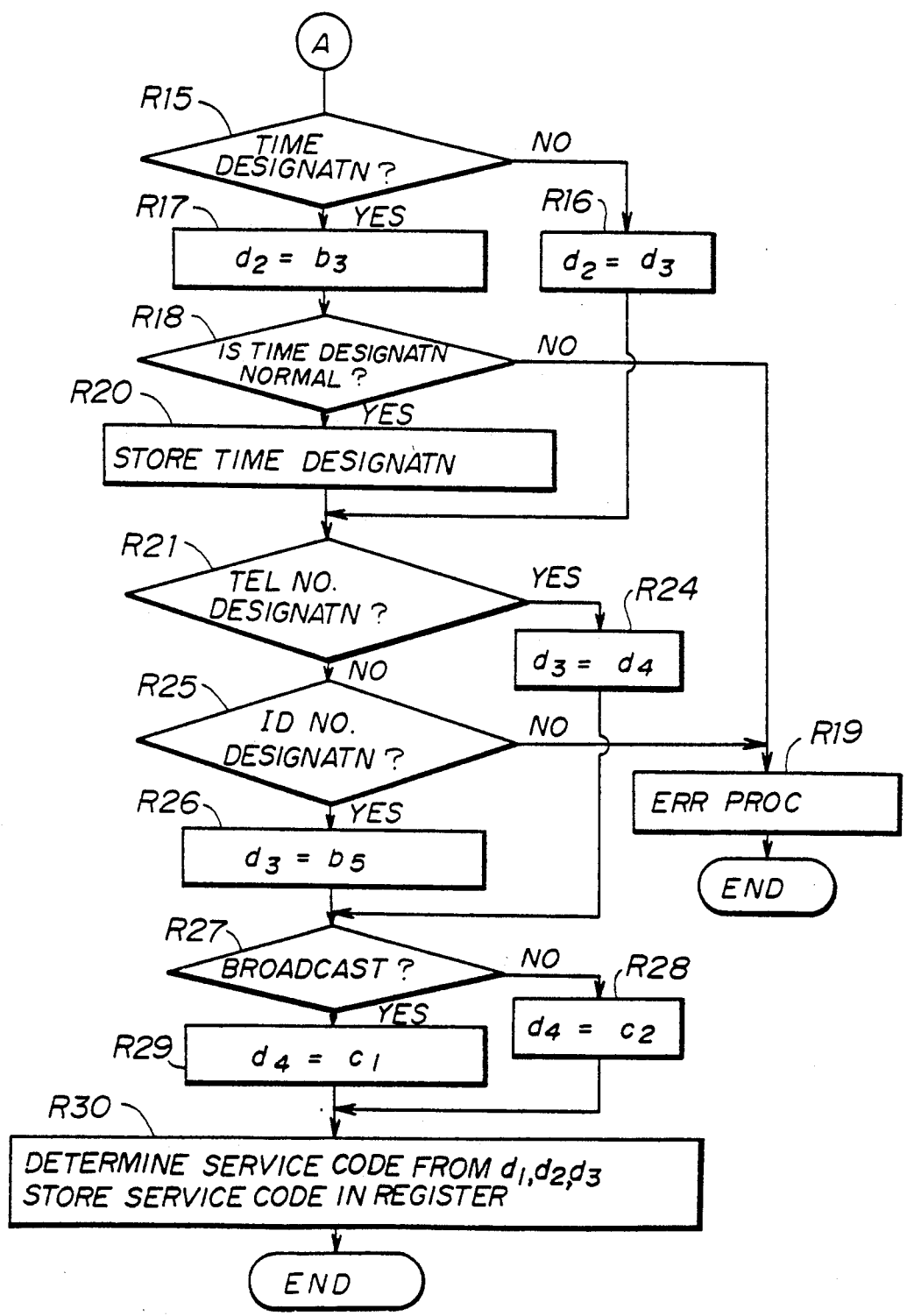
Figure 6:
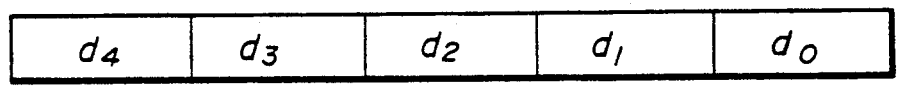
FIG. 6 is a diagram showing a buffer for storing the system parameters.

FIGS. 5A and 5B more specifically show the flow of the OMR inquiry analysis which is carried out primarily by the channel control part 16. A step R1, as shown in FIG. 5A, checks whether a voice guidance, which helps an operator take the necessary steps, is requested by the OMR data sheet 30 as shown in FIG. 3. If a position of the OMR data sheet 30, which is indicated by "YES" in the voice guidance indication mark 30i in FIG. 3, is marked, then a step R2 sets a system parameter "d0" in a system parameter buffer provided within the instruction information memory 21, as shown in FIG. 6, to "a2". This character code "a2" indicates that the step P2, in the operating steps shown in FIG. 2, be taken following the step P1. If a position of the OMR data sheet 30, which is indicated by "NO" in the voice guidance indication mark 30in FIG. 3, is marked, then a step R3 sets the system parameter "d0" in the system parameter buffer shown in FIG. 6, to "a1". This character code "a1" indicates that the step P3, as shown in FIG. 2, be taken following the step P1. The system parameter "d0" which is stored in the system parameter buffer shown in FIG. 6 is used in this manner to determine which of the operating steps P2 and P3 be taken after the step P1 (calling the facsimile mail system 1) is ended as in FIG. 2. The other system parameters "d1" through "d4" stored in the system parameter buffer shown in FIG. 6 are used respectively for different purposes. For example, the system parameter "d1" is to select either a mail box designation or a mail board designation, the system parameter "d2" is to determine whether a time designation transmission is requested by the OMR data sheet, and the system parameter "d3" is to select either a terminal identification number or a telephone number for indicating a destination terminal. And, the system parameter "d4" is used to determine whether a broadcasting transmission should be carried out.

After the system parameter concerning the voice guidance is determined, a step R4 shown in FIG. 5A, makes a decision on whether a mail box designation is requested by the OMR data sheet received. This step R4 is carried out by the channel control part 16 of the facsimile mail system 1. If a mail box service is requested by the OMR data sheet, then a step R5 as shown in FIG. 5A, sets the system parameter "d1" to "b2", and a step R6 checks whether a mail box number is assigned. This mail box number may be, for example, a serial number which is assigned sequentially to the text inputted to the mail box in the facsimile mail system 1. If a mail box number is assigned, then a step R7 stores this mail box number in the system information memory 22. If there is no mail box number assigned, then a next step is taken.

In the step R4 above, if the mail box service is not requested by the OMR data sheet 30, then a step R8 makes a decision on whether there is a mail board designation. If a mail board service is requested, then a step R9 sets the system parameter "d1" to "b1", and a step R10 checks whether there is a mail board number assigned. This mail board number is, for example, a serial number which is assigned sequentially to the text inputted to the mail board. If a mail board number is assigned, then a step R11 stores this mail board number in the system information memory 22. If there is no mail board number, then a next step is taken.

In the step R8 above, if the mail board service is not requested, then a step R12 checks whether the text information received is an ordinary text. If the text information is not an ordinary text, then a step R13 performs an error procedure and the OMR inquiry analysis is ended. If the text received is an ordinary text, then a step R14 sets the system parameter "d1" to "d2".

After the setting of the system parameters "d0" and "d1", which relates to the mail box, the mail board and the ordinary text is completed in this manner, the other steps in the OMR inquiry analysis as shown in FIG. 5B are next carried out.

A step R15, as shown in FIG. 5B, makes a decision on whether a time designation transmission service is requested by the OMR data sheet 30. If this time designation transmission is not requested, then a step R16 sets the system parameter "d2" to "d3". This system parameter "d3" may be changed in the following steps. If the time designation transmission service is requested, then a step R17 sets the system parameter "d2" to "b3", and a step R18 checks whether the designated time is normal. If the designated time is not normal, then a step R19 performs an error procedure and the OMR inquiry analysis is ended. If the designated time is normal, then a step S20 stores the designated time in the system information memory 22. Next, a step R21 makes a decision on whether the destination terminal is indicated by a telephone number (TEL NO.). If the destination terminal is indicated by a telephone number, then a step R22 sets the system parameter "d3" to "b4". If the destination terminal is not indicated by a telephone number, then a step R25 checks whether the destination terminal is indicated by an identification number (ID NO.). If no identification number is specified, then the step R19 performs an error procedure and the OMR inquiry analysis is ended. If the destination terminal is indicated by an identification number, then a step R26 sets the system parameter "d3" to "b5". Next, a step R27 makes a decision on whether a broadcast service is requested by the OMR data sheet 30. If a broadcast service is not requested, then a step R28 sets the system parameter "d4" to "c2". If a broadcast service is requested, then a step R29 sets the system parameter "d4" to "c1". After the setting of these system parameters "d1", "d2" and "d3" is completed, a step R30 determines a service code based on these system parameters and stores the service code in a register. Then, by reading and detecting the system parameters stored in the system information memory 22 to determine the type of service function which is requested by the operator at the communication terminal, and it is possible to prepare and edit an operations manual for requesting such a service function of the facsimile mail system 1. Accordingly, the facsimile mail system 1 can prepare and edit an operations manual appropriate for the request made by the operator with the OMR data sheet.

Next, a description will be given of the procedure of preparing and editing of an operations manual according to the present invention, with reference to FIGS. 7A and 7B. This procedure is carried out primarily by the edit control part 23 of the facsimile mail system 1.

Figure 7A:
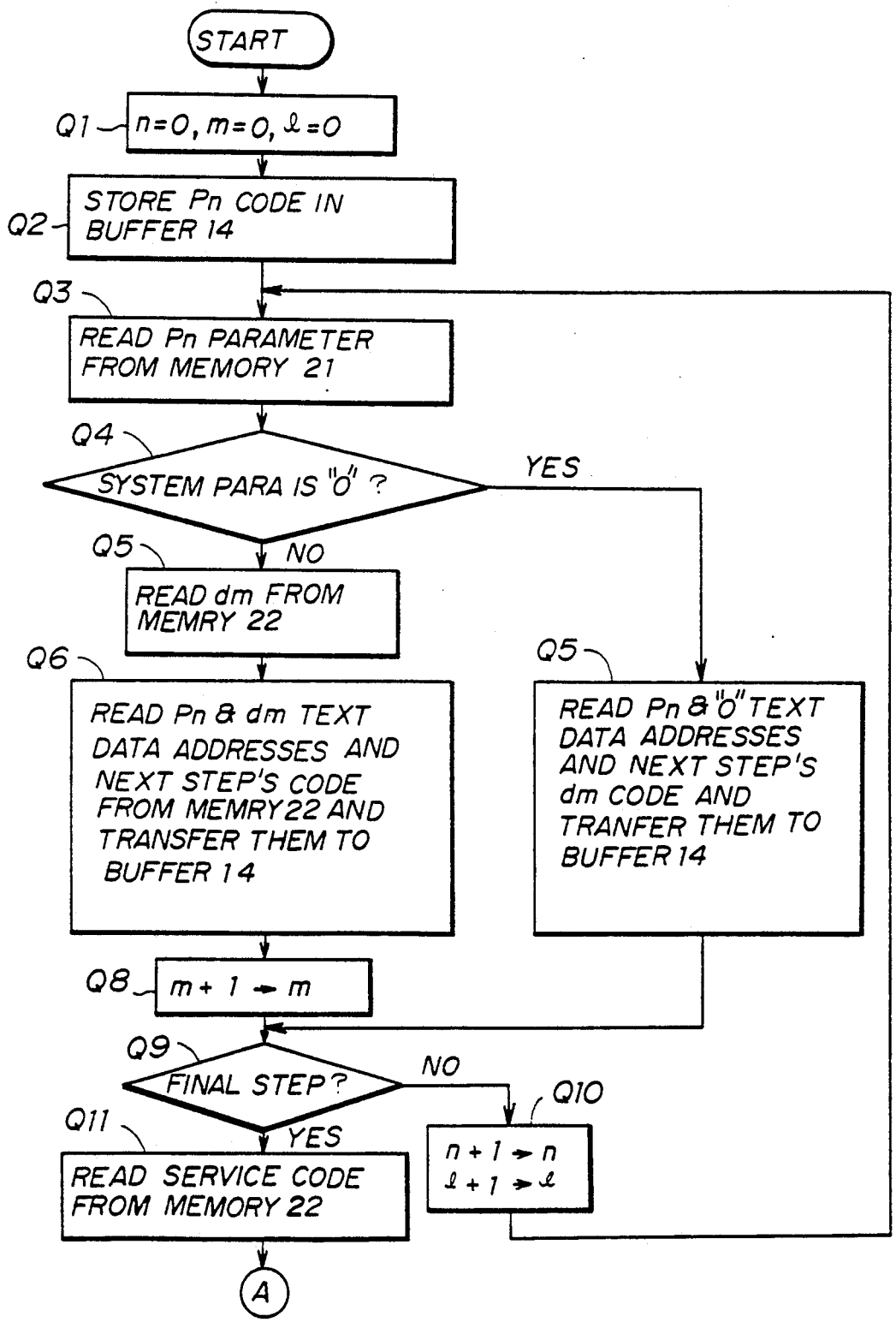
FIGS. 7A and 7B are a flow chart for explaining the procedure to edit and make an operations manual.
Figure 7B:
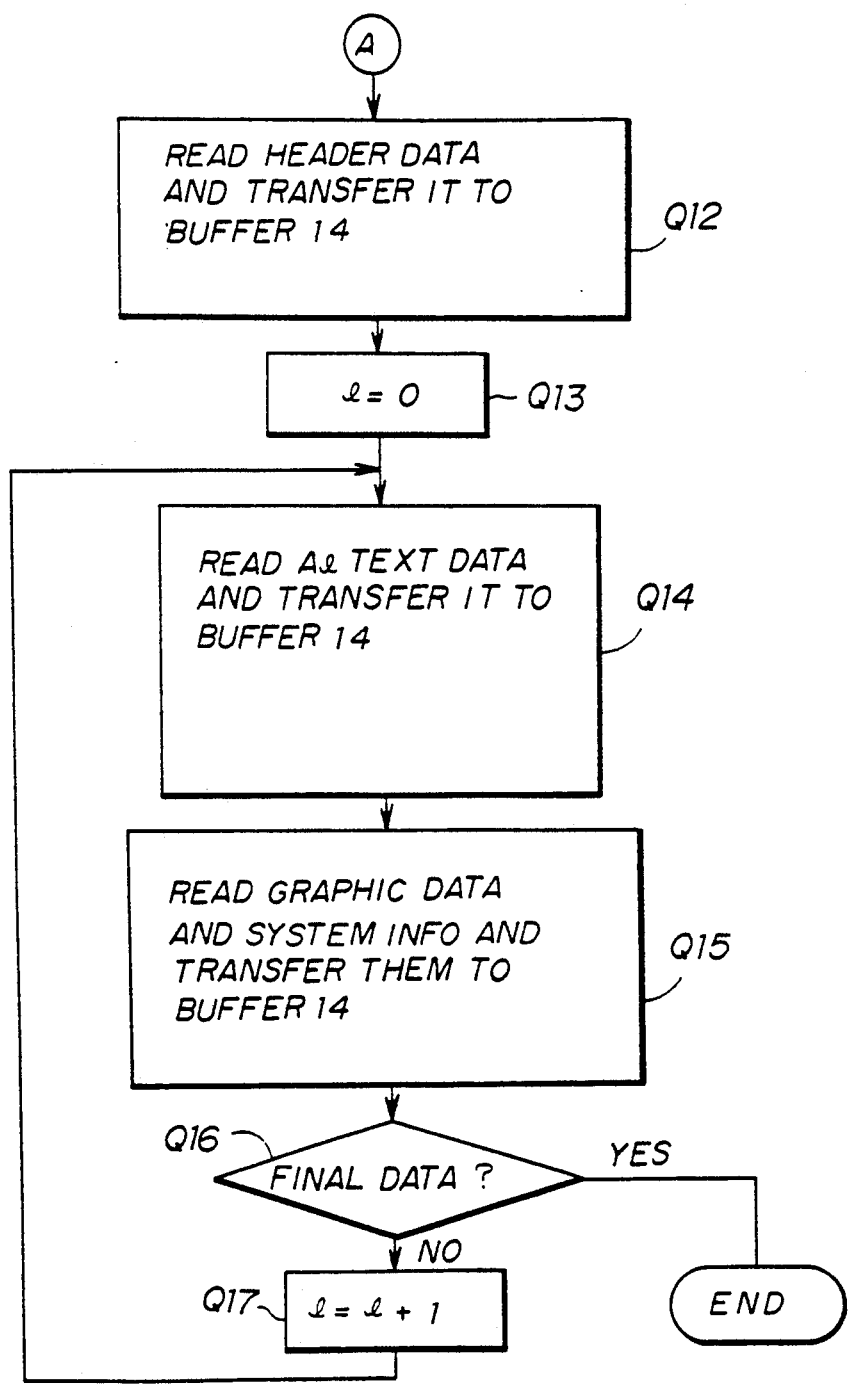
Figure 8:
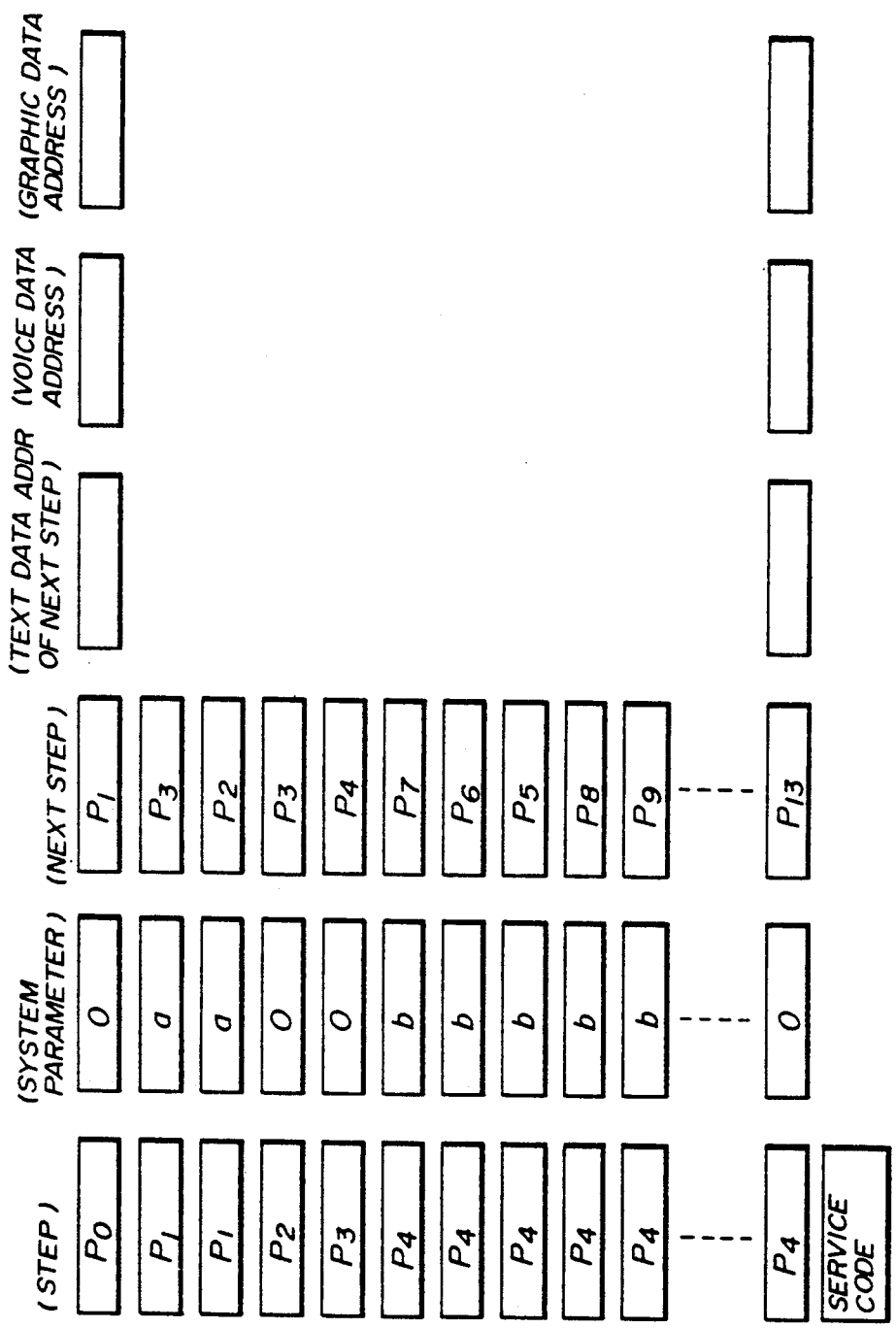
FIG. 8 is a diagram for explaining the contents of an instruction information memory 21.

As shown in FIG. 7A, a step Q1 resets three counters "n", "m" and "1" to zero, and a step Q2 stores a code corresponding to an operating step Pn (in this case, the counter "n" is varied from 0 to 13) in the operations manual making buffer 14. This code corresponding to the operating step Pn is usually a memory address for a guidance text data in the instruction information memory 21. Initially, a code corresponding to an operating step P0 is stored in the operations manual making buffer 14. A step Q3 reads the system parameter "dm" (in this case, the system parameters "d0" through "d4" being set up as shown in FIGS. 5 and 6) corresponding to the operating step Pn from the instruction information memory 21. A step Q4 checks whether the system parameter is "0". If the system parameter is "0", then a step Q5 reads an address of guidance text data corresponding to that system parameter in the operating step Pn, as well as a code corresponding to the next operating step Pn+1, and stores them in the operations manual making buffer 14. If the system parameter is not "0", then a step Q6 reads the value of the system parameter "dm" from the system information memory 22. And, a step Q7 reads an address of guidance text data corresponding to the system parameter "dm" and a code corresponding to the next operating step Pn+1 from the instruction information memory 21 and transfers them to the operations manual making buffer 14 at an address A"1" (in this case, the counter "1" is varied from "0" to "1"). The relationship between the operating steps Pn and Pn+1, the system parameters "dm" are as shown in FIG. 8. Once the operating step Pn and the system parameter "dm" are given, the next operating step Pn+1 may be determined based on such given data, and the address of guidance text data may also determined in accordance with the next operating step Pn+1. Accordingly, the system parameters and the operating steps can freely be combined and predetermined, and therefore the subsequent operating steps can also be determined based on the system parameters and the preceding operating steps given, and a set of guidance text data which describe what operation is required by the operator to make the facsimile mail system 1 perform a desired service function for each of the operating steps.

Figure 9:
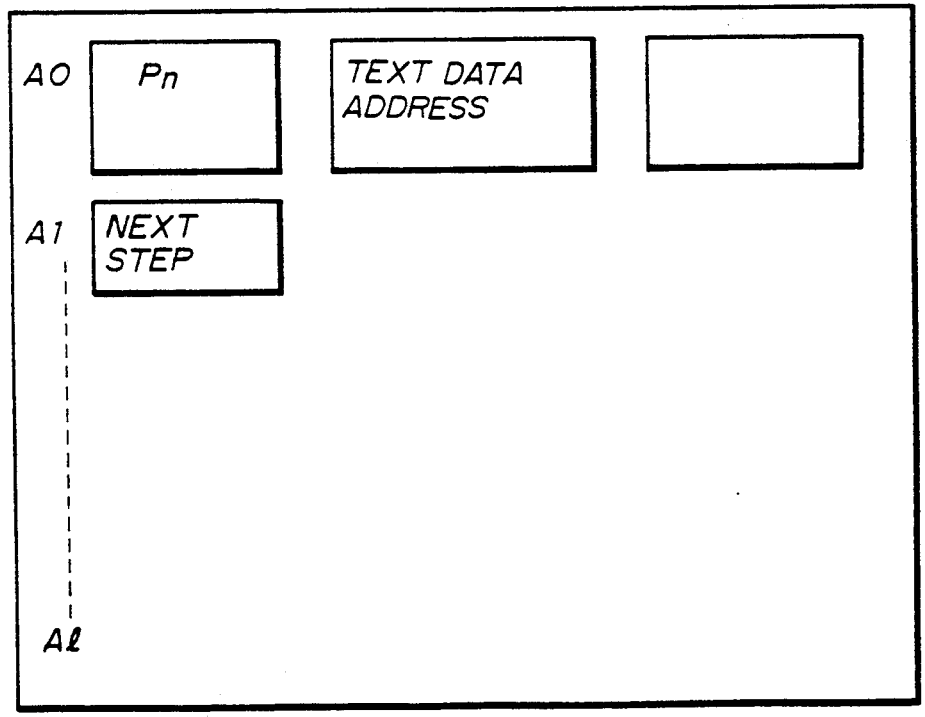
FIG. 9 is a diagram for explaining the contents of an operations manual making buffer.

In this manner, after the next operating step Pn+1 and the system parameter "dm" corresponding to the operating step P0 and the system parameter "a0" are initially determined, a step Q8 counts up the value of the counter "m" to "m+1", and a step Q9 checks whether the operating step concerned is the final step. If the operating step is not final, then a step Q10 counts up the value of the counters "1" and "n" to "1+1" and "n+1", respectively. And, the above described steps Q3 through Q8 ar again taken to repeat the steps Q3 through Q8 in a manner described above until the final operating step is reached, thereby determining the next operating step Pn+1 and the address of guidance text data corresponding to the next operating step Pn+1 so that the operating steps and corresponding addresses are aligned in order of the address "A1" where they are stored in the operations manual making buffer 14, as shown in FIG. 9. The information stored in the buffer 14 as shown in FIG. 9 includes the codes of the operating steps Pn required for a service function requested by the operator, and the addresses of guidance text data corresponding to the operating steps Pn.

Next, a step Q11 reads a service code from the system information memory 22. A step Q12 extracts a corresponding header information and transfers the corresponding header information to a header region 40a of an operations manual 40 within the operations manual making buffer 14 as shown in FIG. 10. A step Q13 resets the counter "1" to zero. Then, a step Q14 reads the guidance text data at the address "A1" (in this case, the counter "1" is varied from "0" to "1"), and transfers it to a character data region 40b of the operations manual 40 at a corresponding position of that address within the operations manual making buffer 14. A step Q15 reads a graphic data related to the guidance text data from the instruction information memory 21 and reads system information from the system information memory 22, and transfers them to an image region 40c at a corresponding position of that address in the operations manual making buffer 14. This graphic data is previously stored in the instruction information memory 21 such that the graphic data is related to the guidance text data or independently of the guidance text data. And the system information stored in the system information memory 22 includes, for example, telephone numbers (TEL.NO.), identification numbers (ID.NO.) and the like. After all the information is transferred to the corresponding addresses in the operations manual making buffer 14, a step Q16 checks whether the data concerned is the final data. If the data is not final, then the current value of the counter "1" is increased to "1+1" and the step Q14 is again taken. The steps Q14 through Q16 are repeated until all the guidance text data, the graphic data and the system information are transferred to the operations manual 40 at the corresponding addresses "A1" in the operations manual making buffer 14. Then, when the final data is found, the preparing and editing procedures of the operations manual is completed.

The operations manual 40 prepared and developed in the operations manual making buffer 14 is outputted from the facsimile mail system 1 to a communication terminal. An operations manual 50 as shown in FIG. 11 is received by any communication terminal from the facsimile mail system 1. Using or making reference to this operations manual 50, an operator at the communication terminal can obtain a desired service function from the facsimile mail system 1 by following the instruction steps or procedure given in the operations manual received. But this outputting method is not limited to only one specific outputting method. For instance, this outputting procedure may be a direct transmission of the operations manual 50 to a communication terminal just when the operations manual is edited and prepared. Or, it may be a transmission of the operations manual 50 to an appropriate mail box provided in the facsimile mail system 1, this operations manual 50 temporarily stored in the mail box being transmitted to a communication terminal when a request for outputting the operations manual is made. And, this communication terminal to which the operations manual 50 is outputted may be either a communication terminal from which the request is made, or another communication terminal which is designated, upon request, as an output device for the operations manual.

Next, a description will be given of another embodiment of an operations manual editing system which may be applied to an information processing system such as a wordprocessor, with reference to FIG. 12 through FIG. 15.

Figure 12:
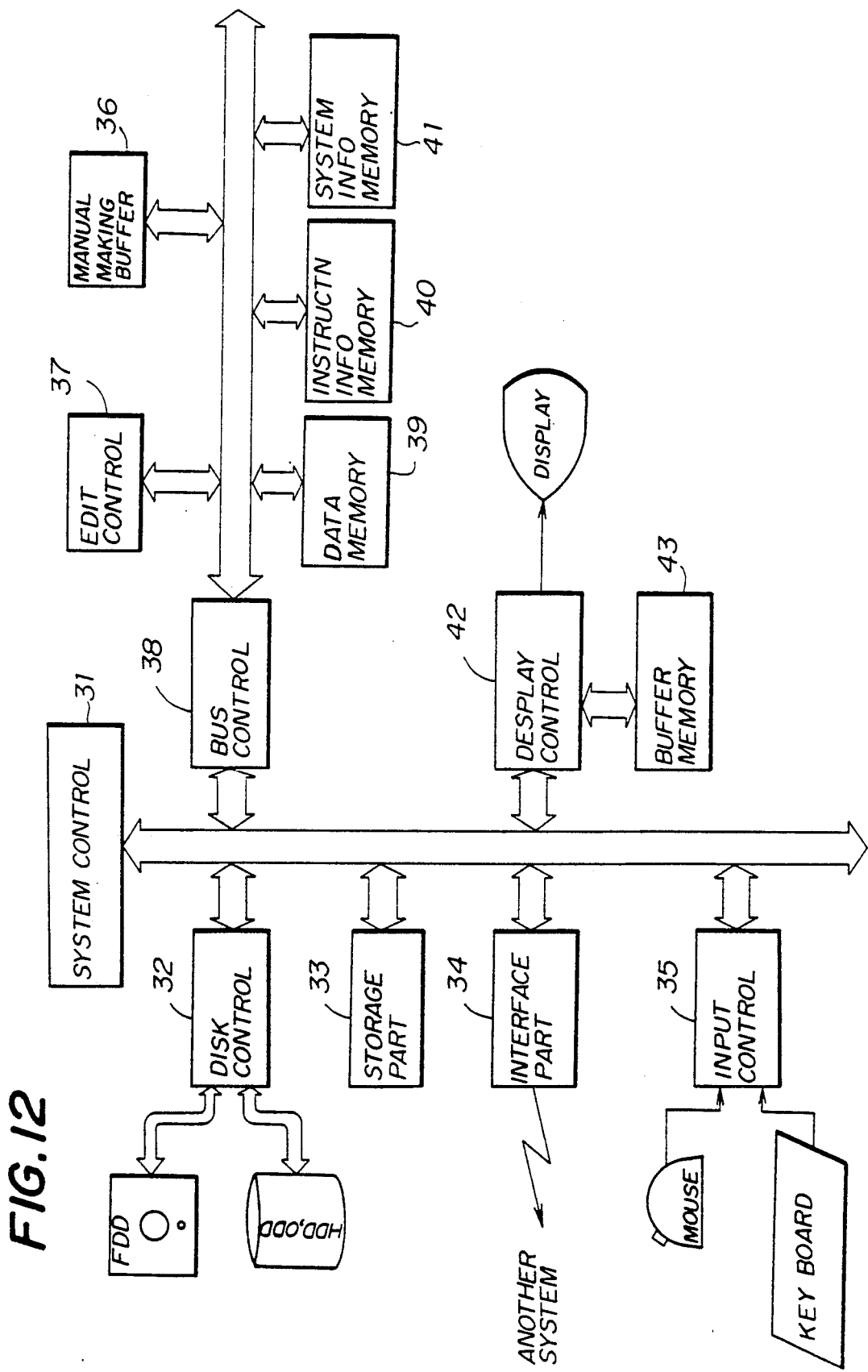
FIG. 12 is a block chart for explaining the construction of a general-purpose information processing system to which another embodiment of the present invention may be applied.

FIG. 12 shows the construction of this information processing system to which an embodiment of the present invention may be applied. As shown in FIG. 12, this information processing system generally has a system control part 31, a disk control part 32 for controlling operation of a floppy disk drive and a hard disk drive (or optical disk drive), a storage part 33, a communication control part 34 having an interface with another information processing system such a computer system, an input control part 35 for controlling operation of input devices such as a mouse and a keyboard, the input control part 35 provided for receiving information inputted from these input devices, an operations manual making buffer 36, an edit control part 37, a bus control part 38, a data memory 39, an instruction information memory 40, a system information memory 41, a display control part 42 for controlling operation of a display device, and a display buffer memory 43. In the following paragraphs, a description of the system components shown in FIG. 12 which are the same as those corresponding system components of the facsimile mail system 1 shown in FIG. 1 will be omitted.

Figure 14:
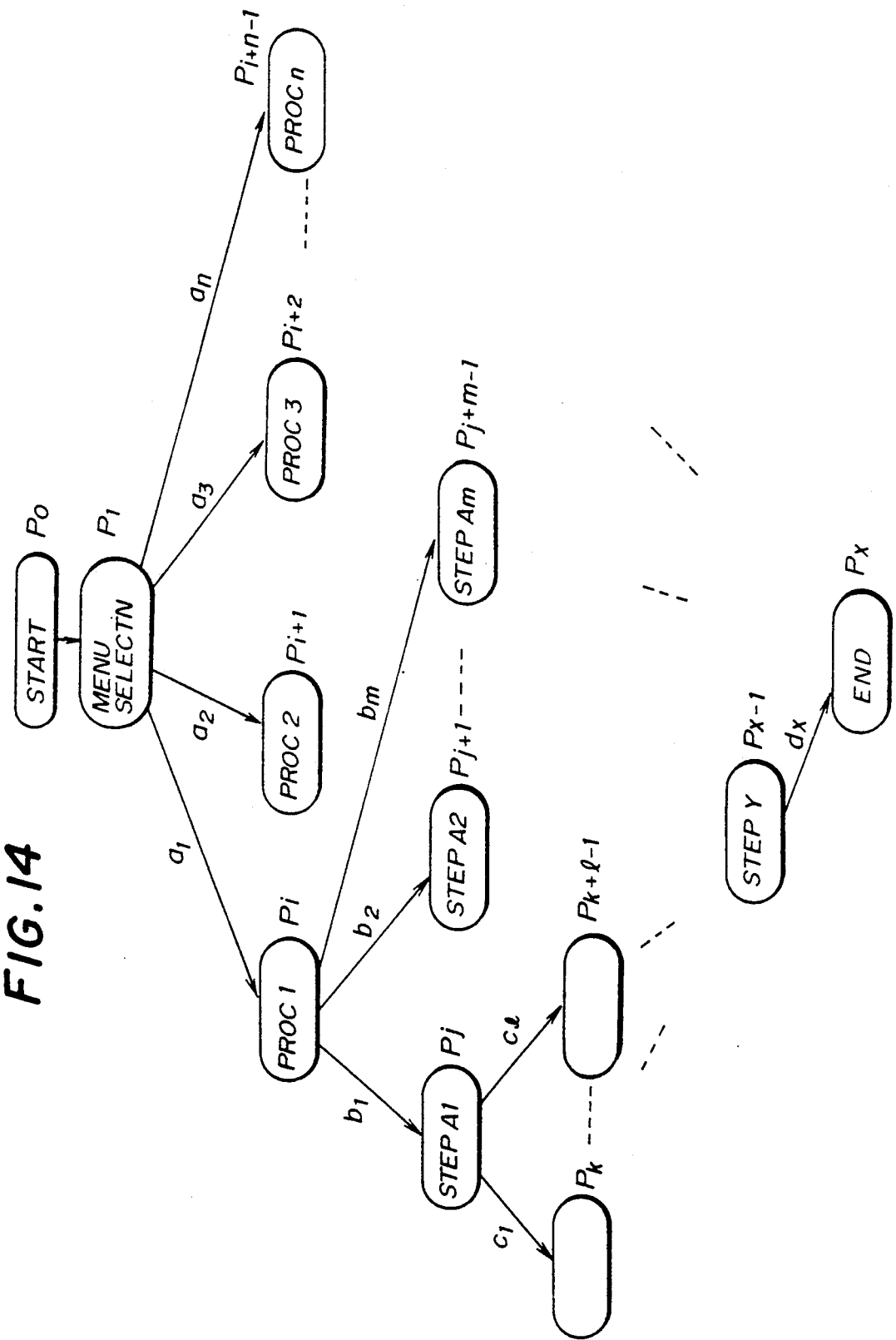
FIG. 14 is a diagram for explaining the procedure of operating steps used in the operations manual editing system in FIG. 12.
Figure 15:
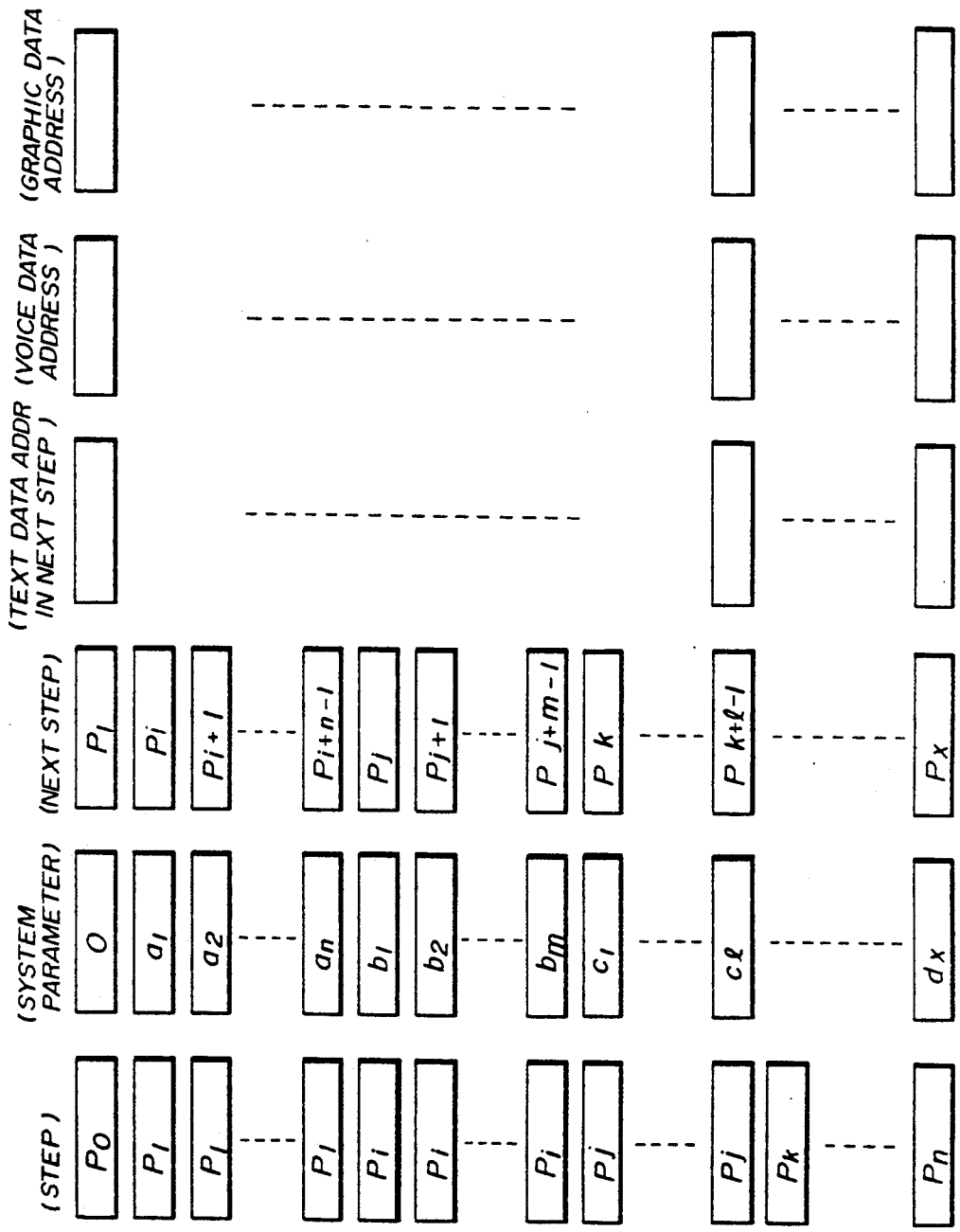
FIG. 15 is a diagram for explaining the contents of an instruction information memory provided in the operations manual editing system shown in FIG. 12.

The storage part 33 as shown in FIG. 12 is a memory part in which a basic control program of the information processing system 30 and related data are stored, the memory part including a read only memory (ROM), a random access memory (RAM) and the others. The data memory 39 is provided to store information which is selected and inputted by a user from an instruction screen appearing on the display device. The instruction information memory part 40 is provided to store information that comprises a set of data being formed in a data structure as shown in FIG. 15 when operating steps are selected in a fashion as indicated in FIG. 14. The display control part 42 has interface with the display device and is capable of converting input data into display information that can be displayed on the display device. The display buffer memory 43 stores such display information in a form of a bit map or coded character data. When a command is given from the system control part 31, the display information is transferred from the memory part 33 (or the disk control part 32) or from the operations manual making buffer 36 to the display buffer memory 43 via the display control part 42.

Figure 13A:
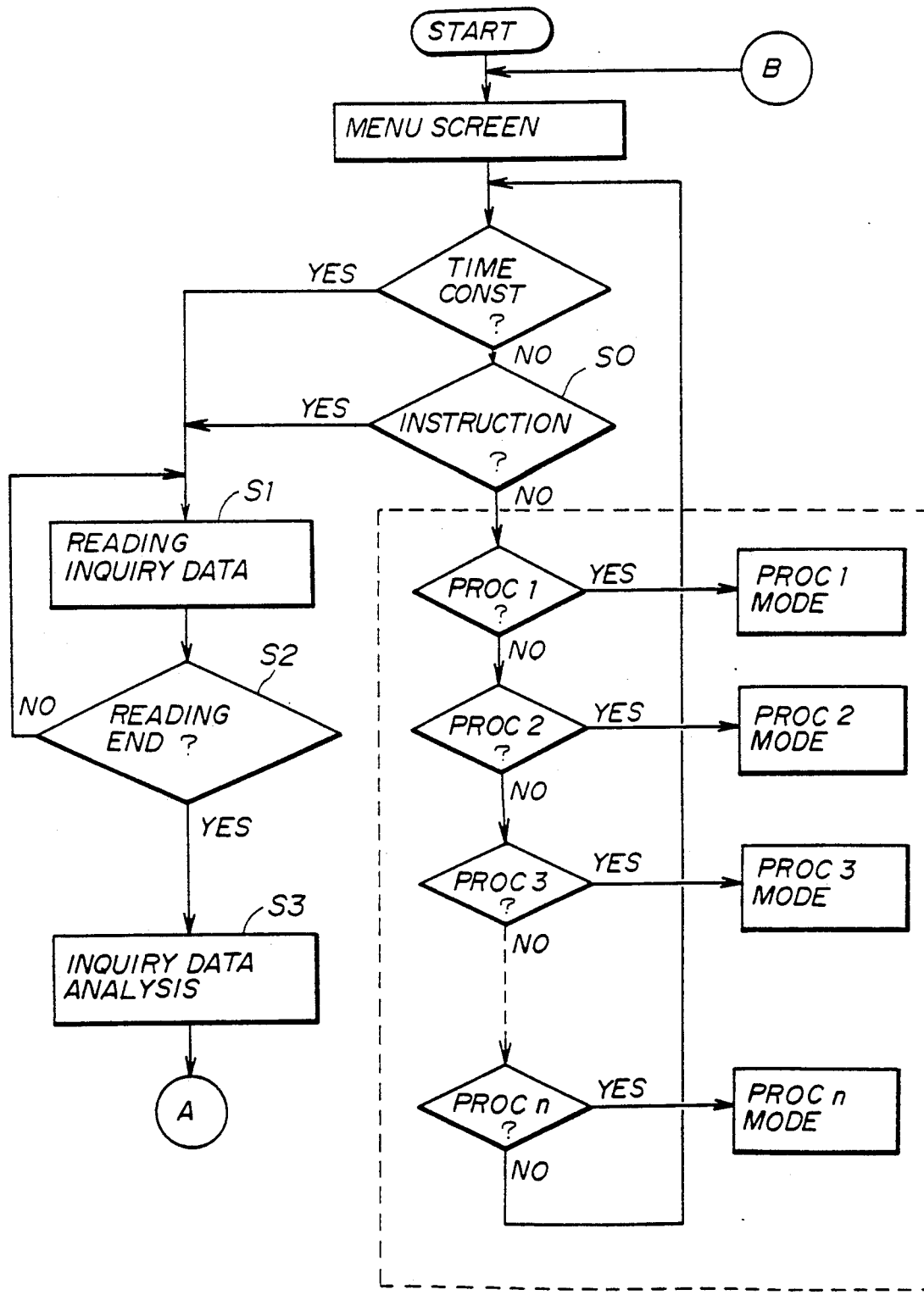
FIGS. 13A and 13B are a flow chart for explaining the operation of the operations manual editing system shown in FIG. 12.
Figure 13B:
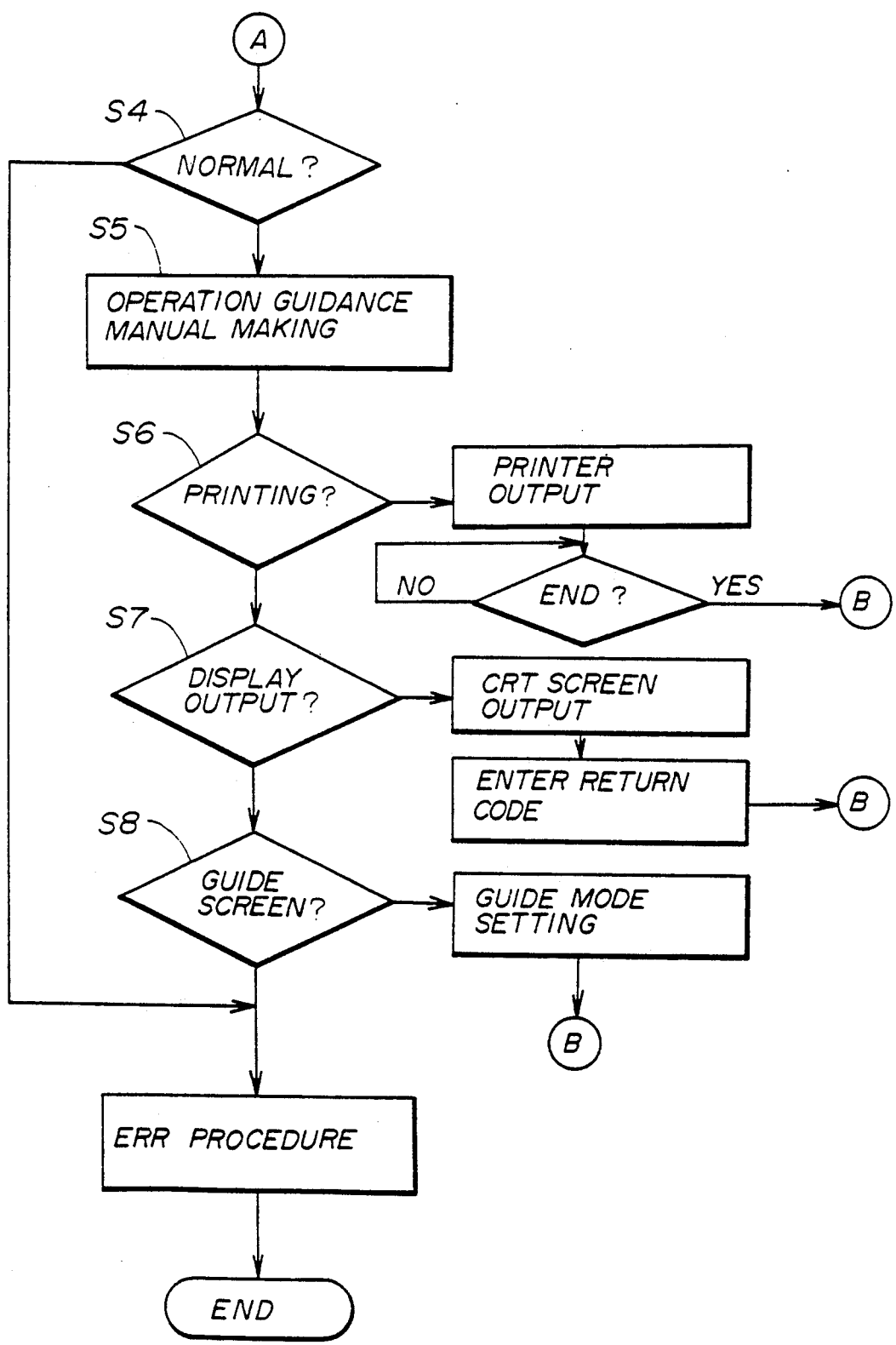

FIGS. 13A and 13B show the flow of operation of the information processing system shown in FIG. 12. An ordinary procedure that is carried out by this information processing system shown in FIG. 12 is indicated by a dotted line in FIG. 13A, and a flow of the inquiry data processing of the information processing system is indicated by the remaining part of FIGS. 13A and 13B. A step S0 makes a decision on whether an inquiry request is made from the keyboard or the mouse. If the inquiry request is not made, then the ordinary procedure is selected. If the inquiry request is made, then the inquiry data processing is selected. This selection is made by depressing a key on the keyboard or by inputting a keyword from the keyboard or by clicking an item on the instruction screen by means of the mouse.

A step S1 performs reading of the inquiry information requested by an operator. This inquiry information is stored in the data memory 39. A step S2 checks whether all the inquiry information is received. A step S3 performs an analysis of the inquiry information received. The inquiry information is analyzed by making reference to the instruction information pre-recorded in the instruction information memory 40 and to the inquiry information stored in the data memory 39.

In the above described embodiments, the description is given of the case where a request for an operations manual is made from a communication terminal. However, the present invention is also applicable to a case where an operator at a keyboard as an input device of the facsimile mail system 1 makes a request for operation of the facsimile mail system itself or a request for operation guidance as to how the operator should operate on the keyboard for making a request for a desired service function of the facsimile mail system. Accordingly, the facsimile mail system 1 can provide an operator with an operations manual which describes how the operator should operate for each of the operating steps required to obtain a desired service function of the facsimile guidance manual. By combining freely several pieces of guidance text information describing each of the operating steps for obtaining such a desired service function, the present invention can prepare, edit and output this operations manual. Consequently, it is possible to provide users with an operations manual which meets sufficiently diverse kinds of the demands from the users, and the operations manual can be prepared without using a great capacity of storage devices for storing information concerning the operations manual. This operations manual provided for the users can deal with the entire procedure of operating steps, from the beginning to the end, required for obtaining a desired service function of a host system. It is possible for any user, even a beginner, to obtain a desired service function of a host system without difficulty or problem by following the operations manual, thereby the present invention improving a man-machine interface and allowing several kinds of service functions of a host system to be fully utilized.

Further, the present invention is not limited to these embodiments, and variations and modifications may be made without departing from the scope of the present invention.

What is claimed is:

1. An operations manual generating and editing system for use with a host system, said system comprising:
    input means for receiving ordering data input when an ordering is made by an operator following a prescribed procedure for requesting an operations manual from the host system;
    first memory means for storing first information needed to prepare the operations manual requested by the operator, the first information being derived from the ordering data received from the input means;
    second memory means for storing instruction information including a first set of guidance text data describing a minimum number of operating steps that need to be carried out by an operator, in order for the host system to execute a desired function chosen from among a plurality of different functions that can be executed by the host system;
    edit control means for analyzing the first information stored in the memory means to select a suitable combination of guidance text data from the instruction information stored in the second memory means, to create an operations manual appropriate for guiding the operator in requesting the desired function of the host system in a minimum number of operating steps; and
    output means for supplying the created operations manual in a prescribed form and layout.

2. The system as claimed in claim 1, wherein:
    the host system is a facsimile main system which has a plurality of prescribed functions including (a) alternate terminal transmission, (b) simultaneous broadcasting, (c) confidential communication transmission, (d) time designation transmission, (e) electronic mail board service, (f) electronic mail box service, and (g) multiple message transmission; and
    the operations manual generating and editing system further comprises means for supplying an operations manual for guiding the operator to request a desired function from among said plurality of prescribed functions.

3. The system as claimed in claim 2, further comprising third memory for storing system information which is pre-recorded for execution of said plurality of different functions of the host system, said edit control means further analyzing the first information to incorporate second information from the system information stored in the third memory means during creation of said operations manual.

4. The system as claimed in claim 3, further comprising buffer memory means for storing information that is used for creating the operations manual, the information stored in the buffer memory means including a memory address for each of the guidance text data in the second memory means to select a suitable combination of guidance text data from the instruction information.

5. The system as claimed in claim 1, wherein said input means comprises a keyboard, said operations manual editing system receiving the ordering data inputted by an operator from said keyboard.

6. An operations manual generating and editing system for use with a host communication system, the system comprising:
a plurality of communication terminals being connected to the host communication system;
receiving means for receiving ordering data input from a first communication terminal among said plurality of communication terminals when an ordering is made by an operator following a prescribed procedure for requesting an operations manual tailored to the host communication system;
first memory means for storing first information needed to prepare the operations manual, the first information being derived from the ordering data from the receiving means;
second memory means for storing instruction information including a set of guidance text data describing a minimum plural number of operating steps that need to be carried out for execution of a desired function from among a plurality of different functions that can be executed by the host communication system;
edit control means for analyzing the first information stored in the first memory means to select a suitable combination of guidance text data from the instruction information stored in the second memory means to prepare an operations manual that contains said suitably combined guidance text data appropriate for enabling the operator to request the desired function of the host communication system in a minimum number of operating steps; and
output control means for transmitting the prepared operations manual to a second communication terminal from among said plurality of communication terminals, in accordance with the ordering data input from the first communication terminal.

7. The system as claimed in claim 6, further comprising third memory means for storing system information which is pre-recorded for execution of said plurality of prescribed functions of the host communication system, said edit control means further analyzing the first information to incorporate a second set of system data from the system information stored in the third memory means into the operations manual during preparation of said operations manual.

8. The system as claimed in claim 6, wherein:
the host communication system is a facsimile mail system which has a plurality of prescribed functions including (a) alternate terminal transmission, (b) simultaneous broadcasting, (c) confidential communication transmission, (d) time designation transmission, (e) electronic mail box service, (f) electronic mail board service, and (g) multiple message transmission; and
the operations manual generating and editing system further comprises means for supplying an operations manual for guiding the operator to request a desired function from among said plurality of prescribed functions of the facsimile mail system.

9. The system as claimed in claim 8, further comprising third memory means for storing system information which is pre-recorded for execution of said plurality of prescribed functions of the host communication system, said edit control means further analyzing the first information to incorporate a second set of system data from the system information stored in the third memory means into the operations manual during preparation of said operations manual.

10. The system as claimed in claim 6, further comprising a buffer memory for temporarily storing information which is used for preparing the operations manual, the information stored in the buffer memory including a memory address for each of the guidance text data in the second memory means to select a suitable combination of guidance text data from the the instruction information.

11. The system as claimed in claim 10, further comprising third memory means for storing system information which is pre-recorded for execution of said plurality of prescribed functions of the host communication system, said edit control means further analyzing the first information from the ordering data to incorporate a second set of system data from the system information stored in the third memory means into the operations manual during preparation of said operations manual.

12. The system as claimed in claim 6, wherein said receiving means comprises a network control means forming part of said host communication system, said network control means being connected to each of the plurality of communication terminals via a communications line for receiving the ordering data input from the first communication terminal.

13. The system as claimed in claim 7, further comprising a buffer memory for temporarily storing information which is used for preparing the operations manual, the information stored in the buffer memory including a memory address for each of the guidance text data in the second memory means to select a suitable combination of guidance text data from the instruction information.

14. The system as claimed in claim 8, further comprising a buffer memory for temporarily storing information which is used for preparing the operations manual, the information stored in the buffer memory including a memory address for each of the guidance text data in the second memory means to select a suitable combination of guidance text data from the instruction information.

15. The system as claimed in claim 13, wherein said receiving means comprises a network control means forming part of said host communication system, said network control means being connected to each of the plurality of communication terminals via a communications line for receiving the ordering data input from the first communication terminal.

16. The system as claimed in claim 14, wherein said receiving means comprises a network control means forming part of the facsimile mail system, the network control means being connected to each of the plurality of communication terminals via a communications line for receiving the ordering data from the first communication terminal.

17. The system as claimed in claim 6, wherein said receiving means comprises an optical mark reader (OMR) for inputting an OMR data sheet carrying the ordering data for requesting an operations manual tailored to the host communication system.

18. The system as claimed in claim 15, wherein said receiving means comprises an optical mark reader (OMR) for inputting an OMR data sheet carrying the ordering data for requesting an operations manual tailored to the host communication system.

19. The system as claimed in claim 8, wherein said prepared operations manual is transmitted to an electronic mail box provided within the facsimile mail system, in accordance with the ordering data input from the first communication terminal through the receiving means.

20. An operations manual generating and editing system which is provided within a facsimile mail system for supplying an operations manual for guiding an operator to request a desired function of the facsimile mail system, the facsimile mail system being capable of executing a plurality of prescribed functions, the operations manual generating and editing system comprising:

a plurality of communication terminals;

network control means connecting a plurality of said communication terminals to the facsimile mail system;

receiving means for receiving ordering data input from a first communication terminal among said plurality of communication terminals when an ordering is made by an operator following a prescribed procedure for requesting an operations manual tailored to the facsimile mail system, the receiving means including an optical mark reader (OMR) for inputting an OMR data sheet carrying the ordering data for requesting the operations manual tailored to the facsimile mail system;

first memory means for storing first information needed to prepare the operations manual, the first information being derived from the ordering data from the receiving means;

second memory means for storing instruction information which includes a set of guidance text data describing a minimum number of operating steps that need to be carried out for execution of a desired function among the plurality of prescribed functions that can be executed by the facsimile mail system;

edit control means for analyzing the first information stored in the first memory means to select a suitable combination of guidance text data from the instruction information stored in the second memory means to prepare an operations manual that contains said suitably combined guidance text data appropriate for enabling the operator to request the desired function of the facsimile mail system in a minimum number of operating steps;

output control means for transmitting the prepared operations manual to a second communication terminal from among said plurality of communication terminals, in accordance with the ordering data input from the first communication terminal;

third memory means for storing system information which is pre-recorded for execution of said plurality of prescribed functions of the facsimile mail system, said edit control means including means for analyzing the first information to incorporate second information from the system information stored in the third memory means when preparing the operations manual; and buffer memory means for storing information which is used for preparing and editing the operations manual, the information including a memory address for each of the guidance text data within the second memory means to select the suitable combination of guidance text data from the instruction information stored in the second memory means.

* * * * *